United States Patent [19]
Matsui

[11] Patent Number: 5,831,775
[45] Date of Patent: Nov. 3, 1998

[54] LONG FOCAL LENGTH MICROLENS SYSTEM

[75] Inventor: Sei Matsui, Chiba, Japan

[73] Assignee: Nikon Corporation, Tokyo, Japan

[21] Appl. No.: 597,458

[22] Filed: Feb. 2, 1996

[30] Foreign Application Priority Data

Mar. 10, 1995 [JP] Japan .................................. 7-079513

[51] Int. Cl.⁶ .................................................. G02B 13/02
[52] U.S. Cl. ............................................ 359/745; 359/684
[58] Field of Search .................................... 359/791, 745, 359/746, 747, 748, 684

[56] References Cited

U.S. PATENT DOCUMENTS

| | | | |
|---|---|---|---|
| 4,844,602 | 7/1989 | Kitagishi et al. | 350/500 |
| 4,907,868 | 3/1990 | Kitagishi et al. | 350/463 |
| 4,929,069 | 5/1990 | Shibayama | 350/423 |
| 4,974,950 | 12/1990 | Yamazaki et al. | 350/500 |
| 4,986,643 | 1/1991 | Moriyama | 350/477 |
| 5,039,211 | 8/1991 | Maruyama | 359/557 |
| 5,182,673 | 1/1993 | Kikuchi et al. | 359/691 |
| 5,270,857 | 12/1993 | Oizumi et al. | 359/554 |
| 5,337,098 | 8/1994 | Imafugi et al. | 354/70 |
| 5,402,197 | 3/1995 | Okano et al. | 254/400 |
| 5,416,558 | 5/1995 | Katayama et al. | 354/446 |

FOREIGN PATENT DOCUMENTS

| | | |
|---|---|---|
| 655 638 | 5/1995 | European Pat. Off. . |
| A 57-169716 | 10/1982 | Japan . |
| A 60-188918 | 9/1985 | Japan . |
| A 62-75412 | 4/1987 | Japan . |
| A 63-157120 | 6/1988 | Japan . |
| A 3-141313 | 6/1991 | Japan . |
| A 5-244160 | 9/1993 | Japan . |
| A 6-130291 | 5/1994 | Japan . |
| A 6-265788 | 9/1994 | Japan . |

*Primary Examiner*—David C. Nelms
*Assistant Examiner*—Dawn-Marie Bey
*Attorney, Agent, or Firm*—Oliff & Berridge, P.L.C.

[57] ABSTRACT

A long focal length microlens system that controls the variation of the aberration from the infinite object distance to shooting at equal magnification. The long focal length microlens system includes a first lens group G1 of positive refractive power a second lens group G2 of positive refractive power and a third lens group G3 of negative refractive power. When focusing from a infinite object distance to a close shooting distance, a value of D1 is reduced while a value of D2 is increased and a condition of $0.16<|\Delta D1|/\Delta D2<0.5$ is satisfied where D1 is a gap of lens apexes between said first group G1 and the second group G2. D2 is a gap of lens apexes between said second group G2 and the third group G3, $\Delta D1$ is (D1 at any object distance)−(D1 in the infinite object distance) and $\Delta D2$ is (D2 at any shooting distance)−(D2 in the infinite object distance).

20 Claims, 41 Drawing Sheets

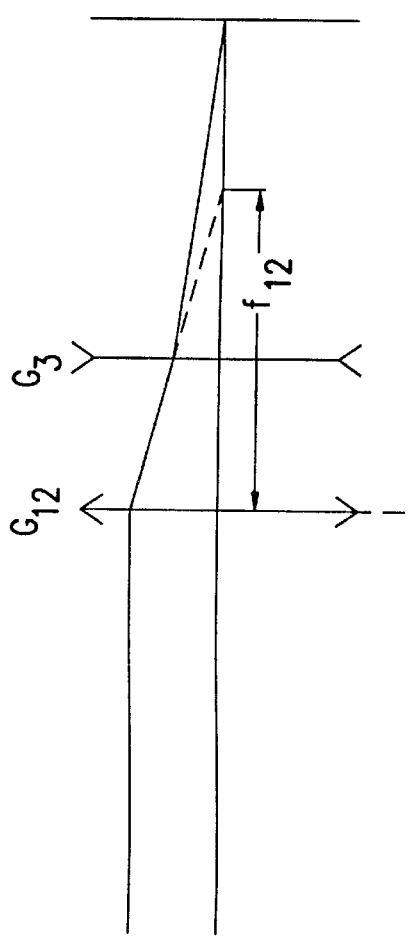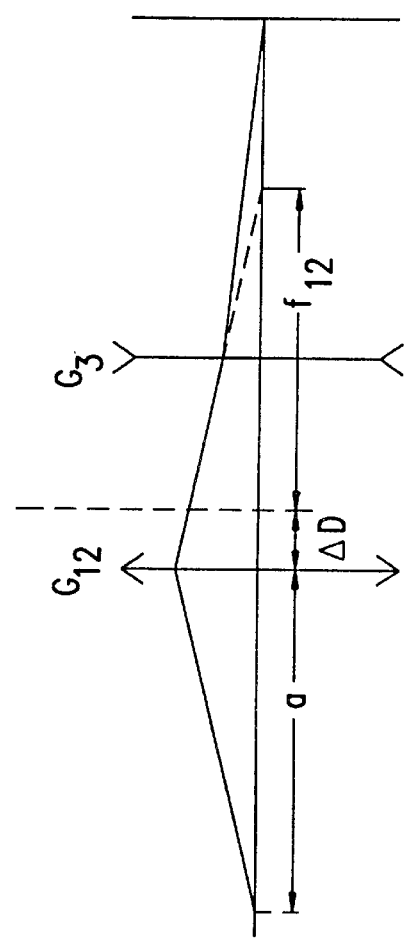

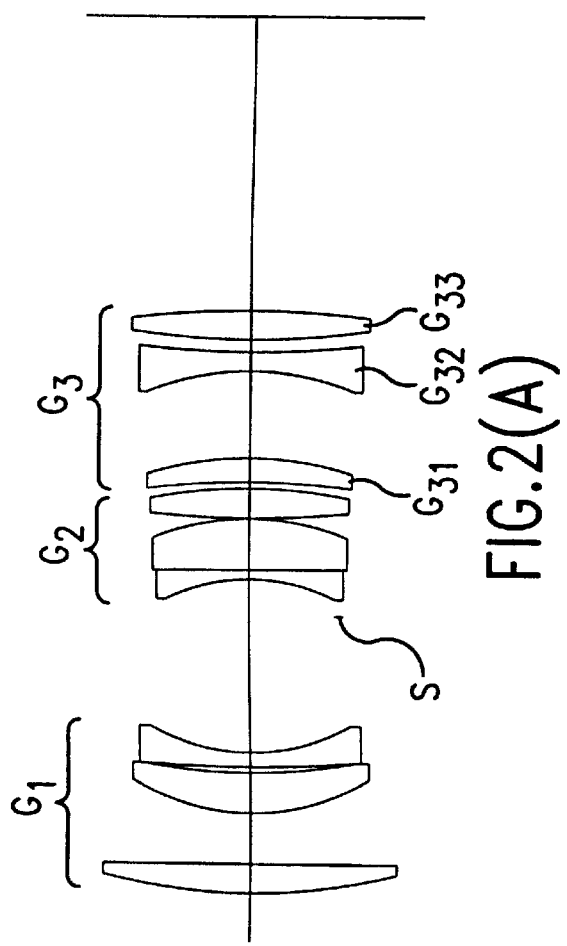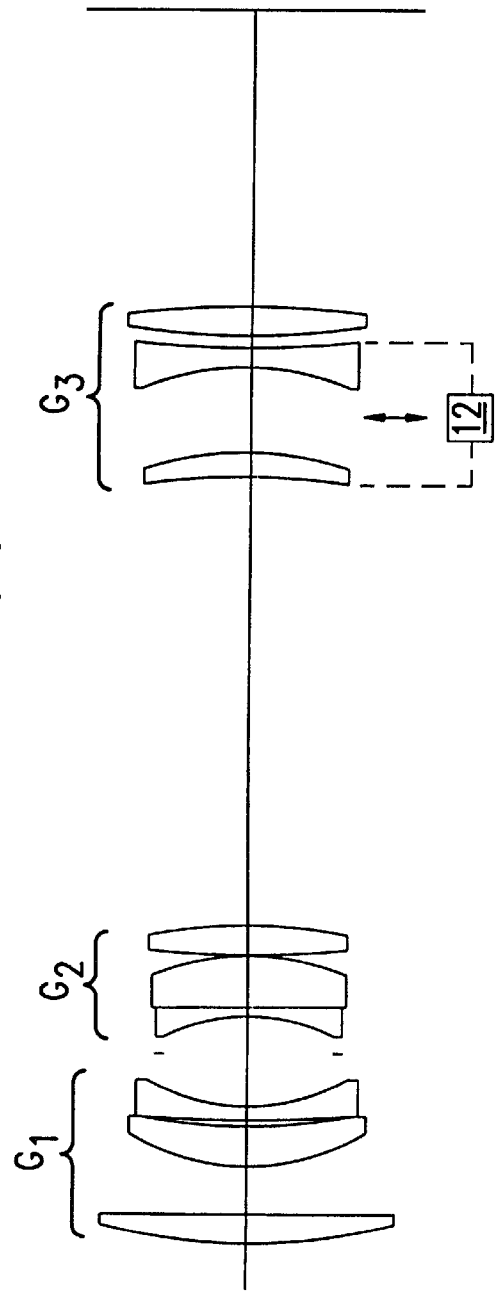

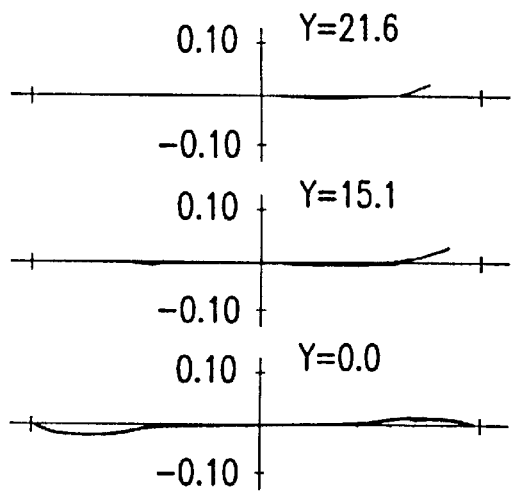
FIG.4(A) TRANSVERSE ABERRATION WHEN NO VIBRATION
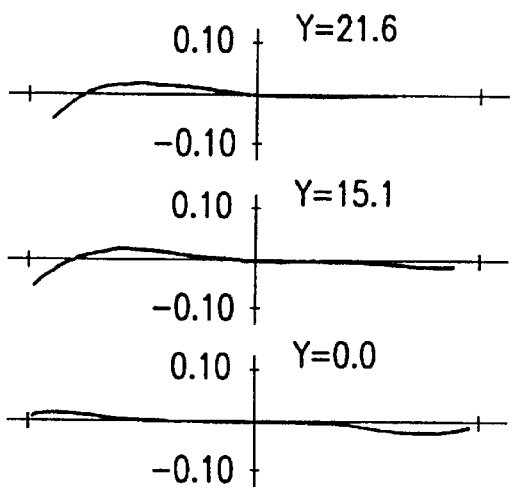
FIG.4(B) TRANSVERSE ABERRATION WHEN NO VIBRATION
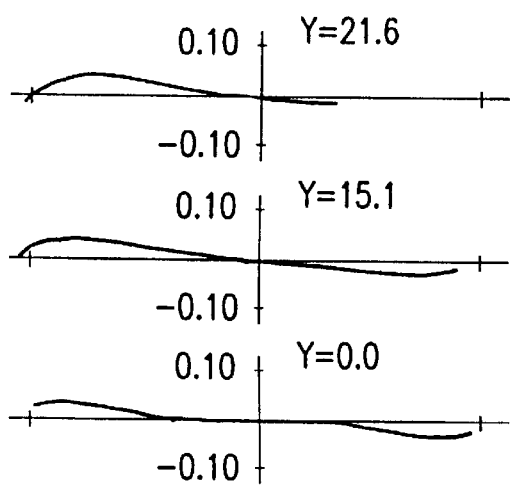
FIG.4(C) TRANSVERSE ABERRATION WHEN NO VIBRATION

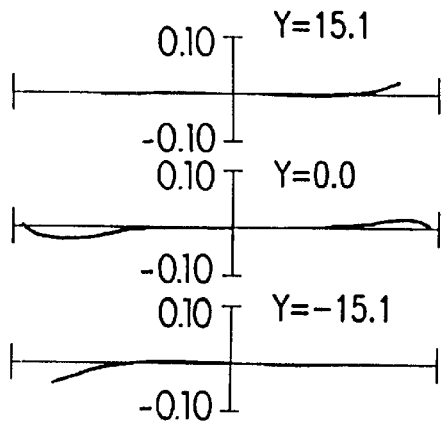
FIG.4(D) LATERAL ABERRATION DURING THE CORRECTING VIBRATION
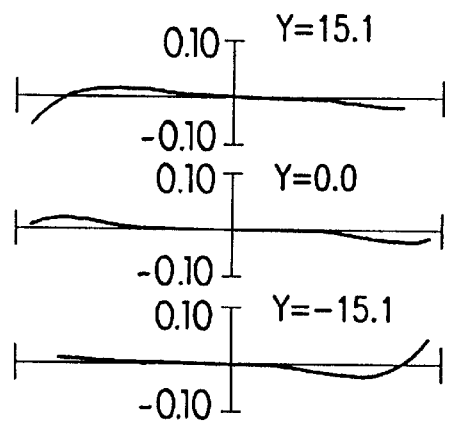
FIG.4(E) LATERAL ABERRATION DURING THE CORRECTING VIBRATION
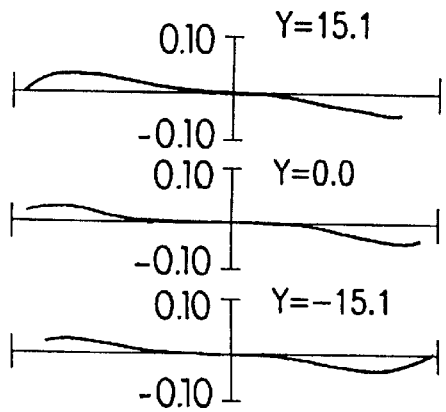
FIG.4(F) LATERAL ABERRATION DURING THE CORRECTING VIBRATION

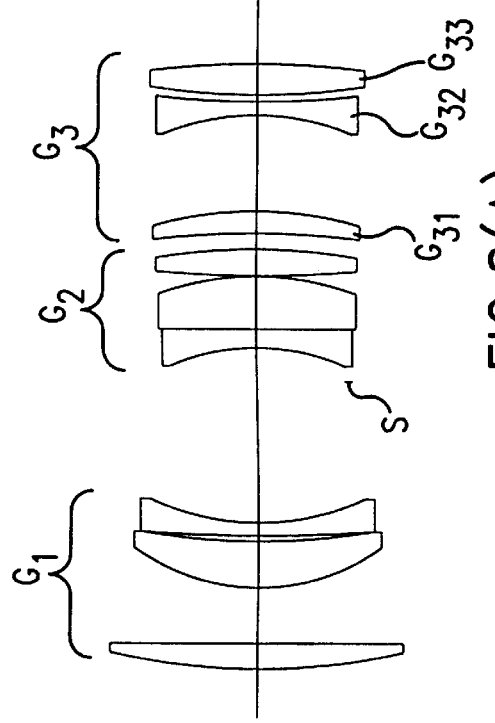
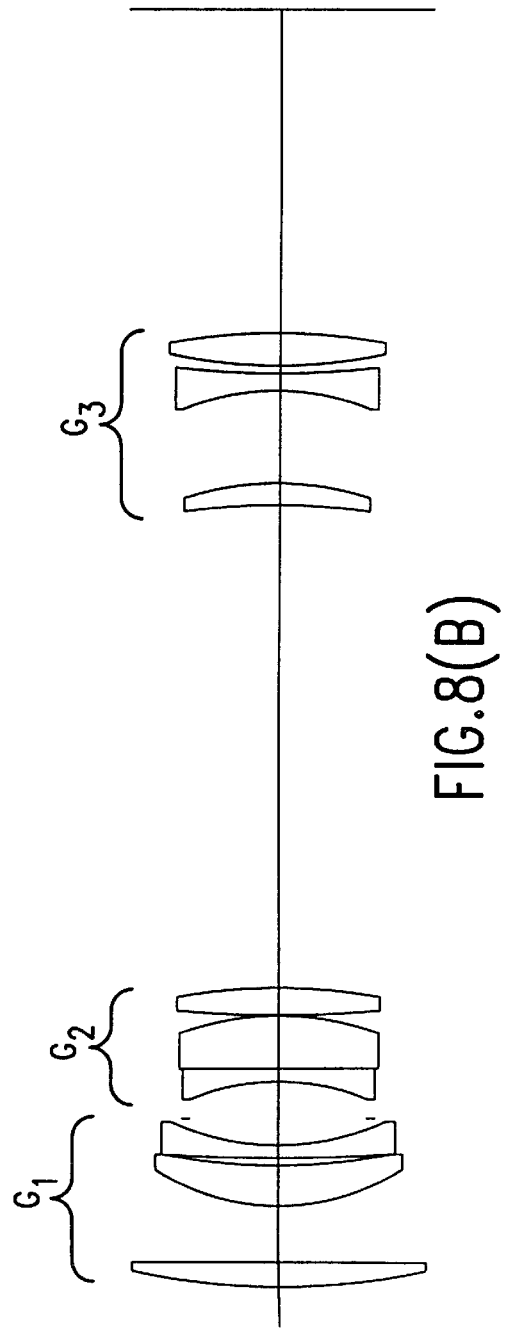

LATERAL ABERRATION
DURING THE CORRECTING
VIBRATION

LATERAL ABERRATION
DURING THE CORRECTING
VIBRATION

LATERAL ABERRATION
DURING THE CORRECTING
VIBRATION

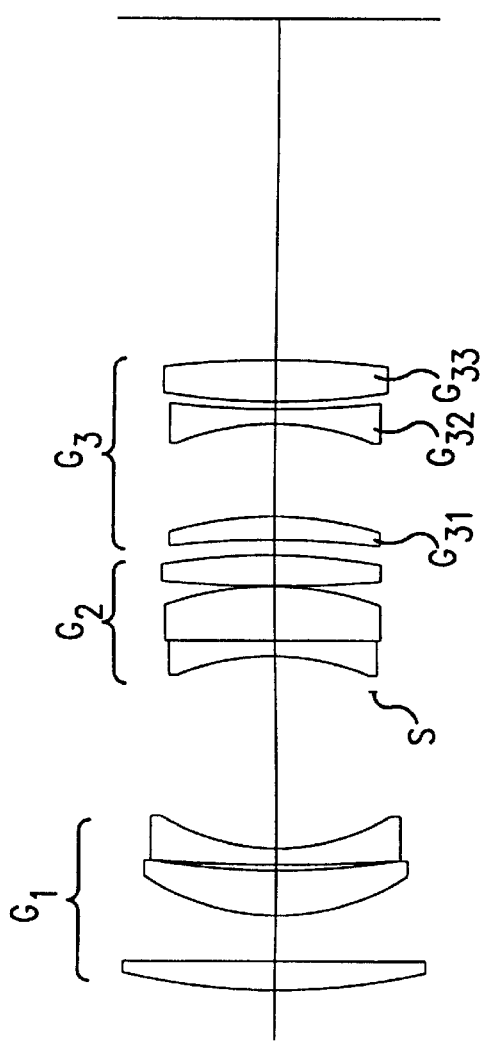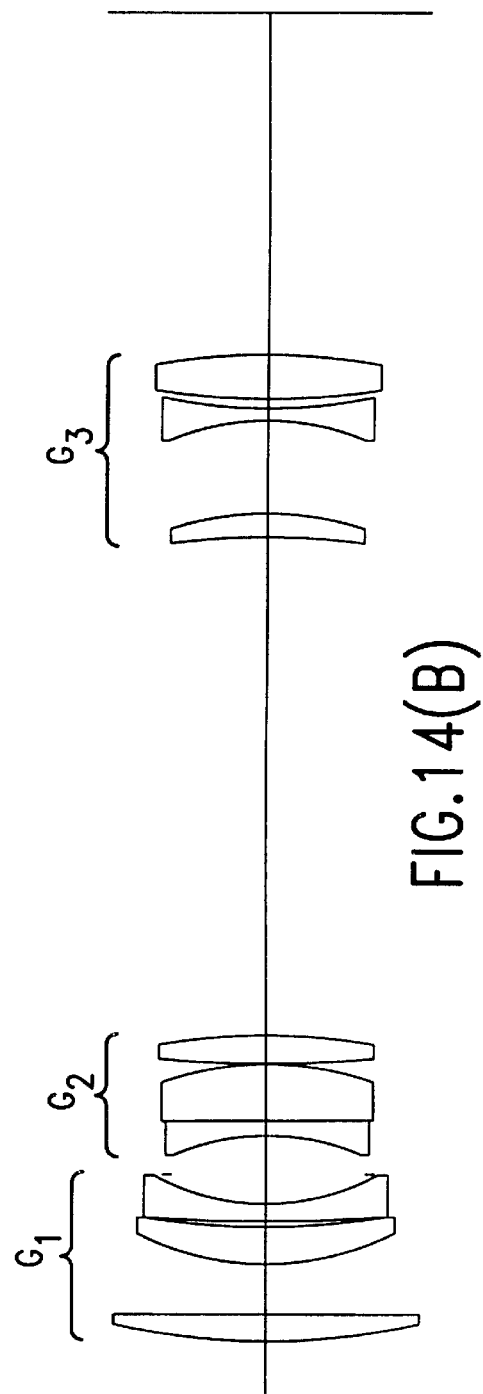

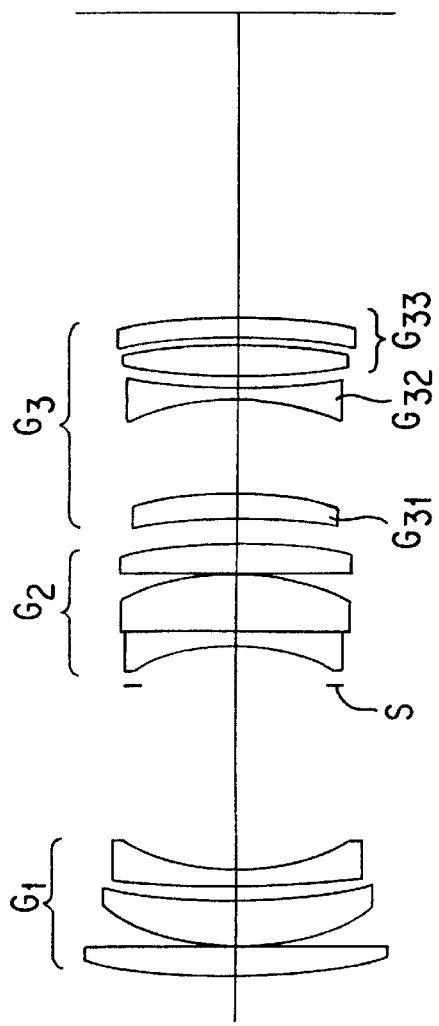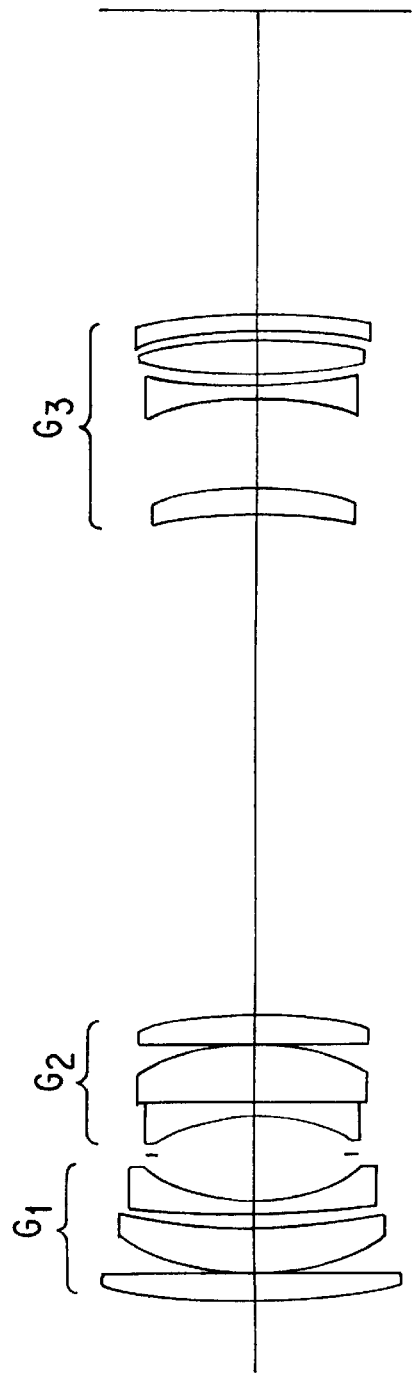
FIG. 20(A)
FIG. 20(B)

LONG FOCAL LENGTH MICROLENS SYSTEM

FIELD OF THE INVENTION

The present invention relates to a long focal length microlens system that can photograph objects from an infinite distance to an equally magnified (1:1) distance.

DESCRIPTION OF RELATED ART

A general shooting lens is able to shoot in the infinite object distance and to shoot at ⅒ magnification. Correcting the aberration needs to be accomplished so that the optical characteristics becomes fine in this range. For the microlens system, on the other hand, because the aberration needs to be corrected when considering shooting from the infinite object distance to ½ magnification or equal magnification, the lens system and method of focusing must be specially designed by changing the structure of the lens system and selecting the focusing method.

Conventionally, there are different lenses in which the shooting in the range from the infinite object distance to ½ magnification or equal magnification are targeted and where the structure of the lens system or the focusing methods are designed to control the variations of the aberrations by changing the shooting magnification, which is the most problematic.

In Japanese Patent Application Sho 60-188918, the subject matter of which is incorporated herein by reference, the lens system is composed of a first group of negative refractive power, a second group of positive power and a third group of negative refractive power. Focusing is accomplished using a method in which the gap between the first group and the second group is extended relatively to the third group which is minimized.

In Japanese Patent Application Sho 62-75412, the subject matter of which is incorporated herein by reference, the lens system includes a first group of positive refractive power, a second group of negative refractive power and a third group of positive refractive power. Focusing is accomplished using a method in which the gap between the first group and the second group increases while moving the first group and the third group together. All the three groups are moved such that the gap between the second group and the third group decreases.

In U.S. Pat. No. 4,986,643, the subject matter of which is incorporated herein by reference, the lens system includes a first group of positive refractive power, a second group of positive refractive power and a third group of negative refractive power. Focusing is accomplished using a method in which the second group and the third group are moved so that the gap between them increases to minimize the gap between the first group and the second group.

In Japanese Patent Application Hei 3-141313, the subject matter of which is incorporated herein by reference, the lens system includes a first group of positive refractive power, a second group of positive refractive power and a third group of negative refractive power. Focusing is accomplished using a method in which the first group and the second group are moved together to the object side.

In Japanese Patent Application Hei 6-130291, the subject matter of which is incorporated herein by reference, the lens system includes a first group of positive refractive power, a second group of positive refractive power and a third group of negative refractive power. Focusing is accomplished using a method in which at least one gap among the gaps between the first group and the second group and the gap between the second group and the third group changes when moving the entire system to the object side.

In the above-described conventional art, aberration graphs show that aberration variations from the infinite object distance to the closest object distance and the entire balance of the aberration is not quite satisfied. Especially among the aberration variations by focusing, there are many lenses which are considered to not have as high of performance as a microlens system, such as a lens in which the variation of the spherical aberration is not fully controlled, a lens in which the control of the variation of the image plane is insufficient or a lens in which the variation of chromatic aberration is not totally controlled. Among those, a lens is included in which equal magnification photography is not realized thus staying with the capability of the ½ magnification photography. Moreover, there are lenses that are mechanically complicated as a result of concentrating the control of the variation of the aberration.

SUMMARY OF THE INVENTION

It is an object of the present invention to solve the difficulty of conventional long focal length microlens systems. A long focal length microlens system is provided in which the structure of the lens system is strong for the variation of aberrations and focusing to control the variation of aberrations. When it has the approximate angle of view of 23°–27° and an F number of approximately 2.8, the variation of the aberration from the infinite object distance to the equal magnification is small and the aberration is well balanced.

It is also an object of the present invention to provide a high performance long focal length microlens system where the degradation of image forming characteristics caused by vibrations of hands is prevented by having an appropriate function.

The present invention provides a long focal length microlens system having a first lens group G1 of positive refractive power, a second lens group G2 of positive refractive power and a third lens group G3 of negative refractive power. When focusing from a infinite object distance to a close object distance, a value of D1 is reduced and a value of D2 is increased to satisfy the following:

$$0.16 < |\Delta D1|\Delta D2 < 0.5 \qquad \text{Equation (1)}$$

wherein: D1 is a gap of lens apexes between the first group G1 and the second group G2; D2 is a gap of lens apexes between the second group G2 and the third group G3; $\Delta D1$ is (D1 at any object distance)–(D1 in the infinite object distance); and $\Delta D2$ is (D2 at any shooting distance) –(D2 in the infinite object distance).

Higher performance can be obtained by forming the lenses such that the value of $|\Delta D1/\Delta D2|$ becomes smaller from the infinite object distance towards a closer object distance.

The present invention also provides a long focal length microlens system where a value of D1 is reduced and a value of D2 is increased when focusing from a infinite object distance to a close object distance to satisfy the following:

$$0.74 < M < 0.84 \qquad \text{Equation (2)}$$

where f12 is a composite focal length of said first lens group G1 and the second group G2; and M is (f12 at the equal magnification object state)/(f12 at the infinite object shooting state), where the equal magnification object state is the 1:1 shooting state.

The present invention also provides a long focal length microlens system where a value of D1 is reduced and a value of D2 is increased when focusing from an infinite object distance to a close object distance to satisfy the following:

$$0.30 < N < 0.60 \qquad \text{Equation (3)}$$

where N is (D1 at the equal magnification object state)/(D1 at the infinite object shooting state).

In each long focal length microlens system described above, focusing can be simplified by moving the third group G3 in the direction of the optical axis at the time of focusing.

Moreover, by composing the third group G3 with at least 3 lower level lens groups, in order from the object side, a first subgroup G31 of positive refractive power, a second subgroup G32 of negative refractive power and a third subgroup G33 of positive refractive power and by forming part of the lower subgroup, such as the first subgroup G31 and the second subgroup G32 to be movable in the direction that crosses the optical axis, degradation of the image forming characteristics caused by vibration at the time of shooting can be decreased while the microlens performance is increased. Then, the lens can satisfy the following:

$$0.80 < f31/|f3| < 0.91 \qquad \text{Equation (4)}$$

where f3 is the focal length of the third group G3 and f31 is the focal length of the first subgroup G31.

The structure of the lens system according to the present invention will be described below based on FIG. 1. A positive lens group that is a combination of the first group G1 and the second group G2 is indicated as a composite lens G12 while the third group G3 is indicated as a negative lens G3. Moreover, FIG. 1(A) shows the lens positions at the infinite object focus state and FIG. 1(B) shows the lens positions at the closest focus state. If the composite focal length of the first group G1 and the second group G2 is given as f12 and the magnification of the third group is given as β3 when the gap between the first group G1 and the second group G2 is fixed in the infinite object focus state, then the focal length f of the entire system is $$f = f12 \cdot \beta 3 \qquad \text{Equation (5)}$$

Moreover, when the magnification of the composite lens G12 is given as β12, then the shooting magnification (lateral magnification) of the entire system m is indicated as $$m = \beta 12 \cdot \beta 3 (m < 0) \qquad \text{Equation (6)}$$

Furthermore, as shown in FIG. 1(B), if the distance from the composite lens G12 and the object is a and the amount of movement of the composite lens G12 from the infinite object shooting state to the closest object shooting state is ΔD, then the magnification β12 of the composite lens G12 is $$\beta 12 = (\Delta D + f12)/a \qquad \text{Equation (7)}$$

Moreover, from Newton's formula ($xx^1 = f^2$) it is indicated as $$\Delta D \cdot (a - f12) = (f12)^2 \qquad \text{Equation (8)}$$

and thus ΔD can be determined as $$\Delta D = m \cdot (f12)^2 / f \qquad \text{Equation (9)}$$

Accordingly, the composite focal length f12 described above becomes small because a method is used in which the gap between the first group G1 and the second group G2 is minimized for focusing from the infinite object distance to the closest object distance. Therefore, as understood from Equation (9), since the amount of movement of the composite lens G12 can be minimized, it is possible to minimize the change of the total length based on focusing at the closest object distance.

Moreover, since the magnification of the third group having negative refractive power can be constructed relatively small, the negative refractive power of the third group G3 can be weakened, which results in an advantage for the correction of the aberration. The present invention is constructed so that a lens can be obtained that can perform good image forming performance in the entire focusing area for shooting from the infinite object distance to the closest object distance while controlling the amount of change of the total length of the lens system for shooting at the closest object distance.

Each conditional equation will now be described. In Equation (1), if the upper limit is exceeded, although its more advantageous to balance the aberrations in the entire body by controlling the variation of aberration from shooting at the infinite object distance to shooting at the closest object distance (since the gap between the first group G1 and the second group G2 becomes smaller and smaller) mechanical interference occurs between the image side lens of the first group G1 and the object side lens of the second group G2. On the other hand, if the lower limit is breached, balancing aberrations by controlling the variation of the aberrations from shooting at the infinite object distance to shooting at the closest object distance becomes difficult. Further, the gap between the first group G1 and the second group G2 becomes larger and larger and the change in the total focusing length becomes big resulting in the loss of compact characteristics. Thus, the upper limit of Equation (1) may also be set to 0.34.

If the upper limit of Equation (2) is exceeded, balancing the aberration by controlling the variations becomes difficult, which is a disadvantage for controlling the total length. On the other hand, if the lower limit is breached, although balancing the aberration by controlling the variation of the aberration becomes an advantage, the resulting minimization of the total length is an advantage since the balance with the third group G3 breaks. However, curvature of the spherical aberration or the coma aberration is easily generated, which is not desirable. Thus, the upper limit of Equation (2) may be set to 0.83 while the lower limit is set to 0.80.

If the upper limit of Equation (3) is exceeded, there is a disadvantage for controlling the variation of the aberration. On the other hand, if the lower limit is breached, the lens apexes gap D1 between the first group G1 and the second group G2 becomes too small causing mechanical interference to easily occur.

If the upper limit is exceeded in Equation (4), the spherical aberration easily becomes over corrected. On the other hand, if the lower limit is breached, the spherical aberration is easily under corrected since the refractive power of the first subgroup G31 of positive refractive power becomes too strong. Neither case is desirable.

Other objects, advantages and salient features of the invention will become apparent from the detailed description taken in conjunction with the annexed drawings, which disclose preferred embodiments of the invention.

BRIEF DESCRIPTION OF THE DRAWINGS

The invention will be described with reference to the following drawings wherein like reference numerals refer to like elements and wherein:

FIGS. 1(A)–(B) show the principle of the present invention;

FIGS. 2(A)–(B) show the structure of the lens at the time of shooting at infinite object distance and at the time of shooting at equal object magnification;

FIGS. 4 (A)–(F) show the aberrations when there is no vibration and when there is vibration;

FIGS. 8(A)–(B) show a third embodiment corresponding to FIG. 2;

FIGS. 14(A)–(B) show a fifth embodiment corresponding to FIG. 2;

FIGS. 20(A)–(B) show a seventh embodiment corresponding to FIG. 2;

DETAILED DESCRIPTION OF PREFERRED EMBODIMENTS

Figure 11A:
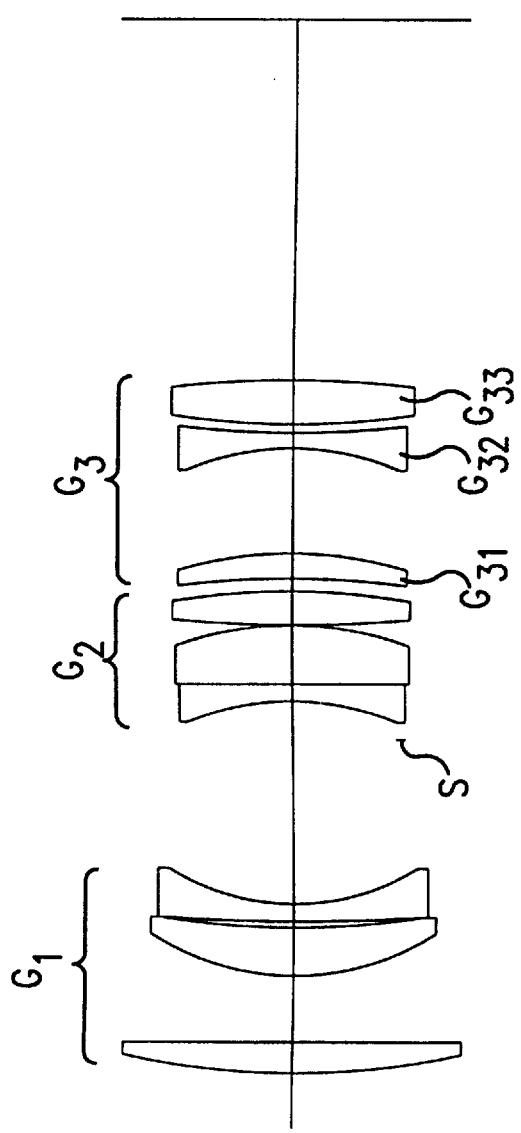
FIGS. 11(A)–(B) show a fourth embodiment corresponding to FIG. 2.
Figure 11B:
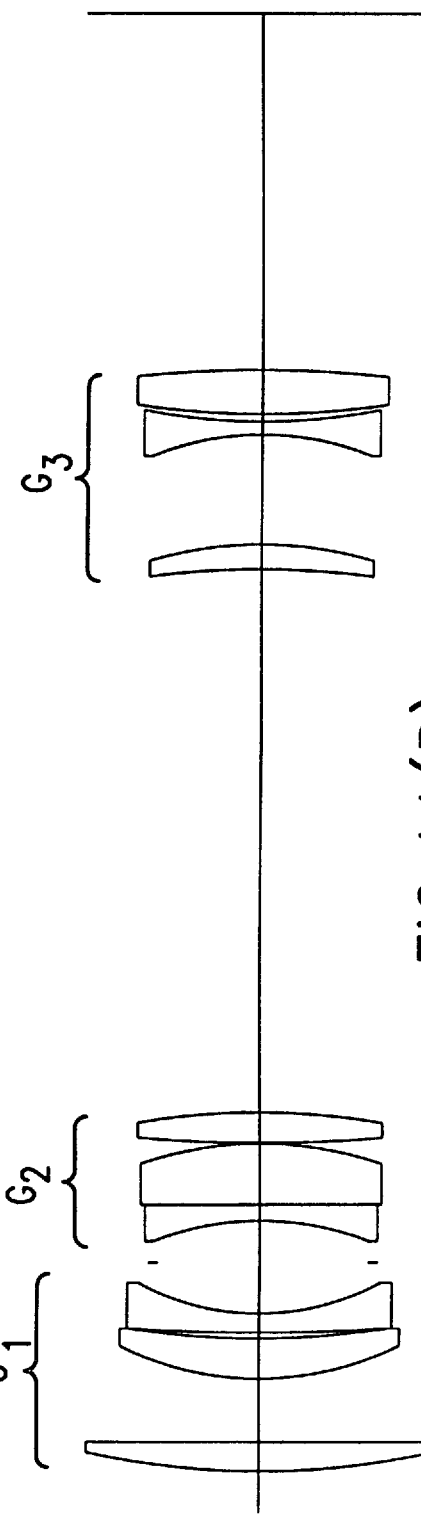
Figure 13A:
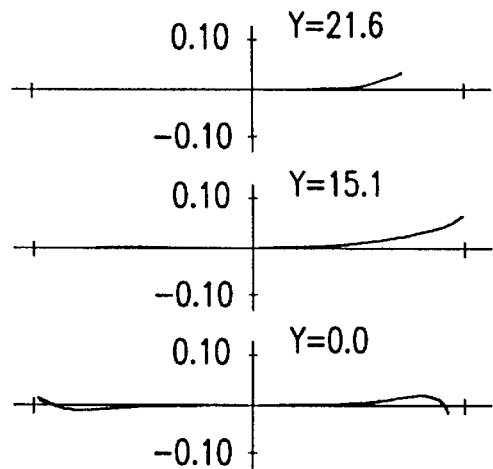
FIGS. 13(A)–(F) show the fourth embodiment corresponding to FIG. 4.
Figure 13B:
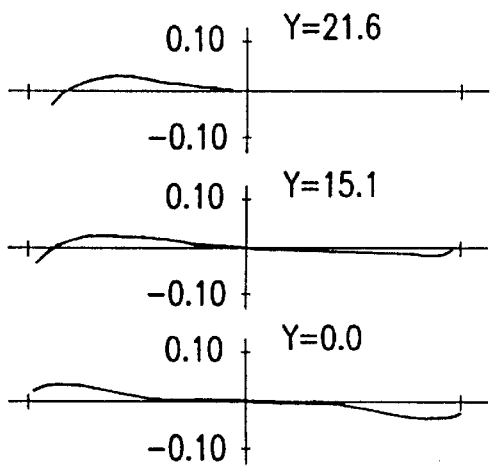
Figure 13C:
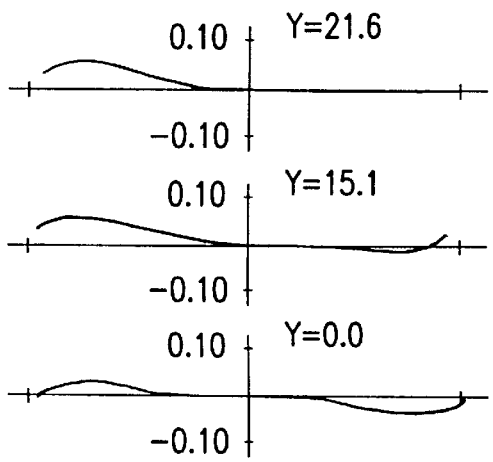
Figure 13D:
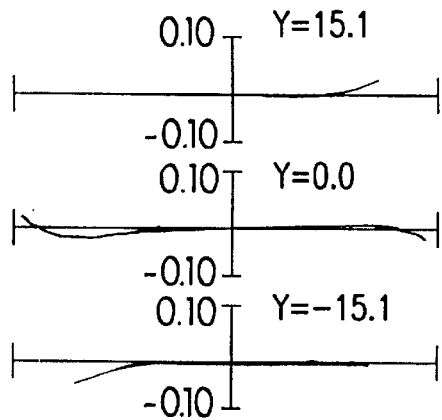
Figure 13E:
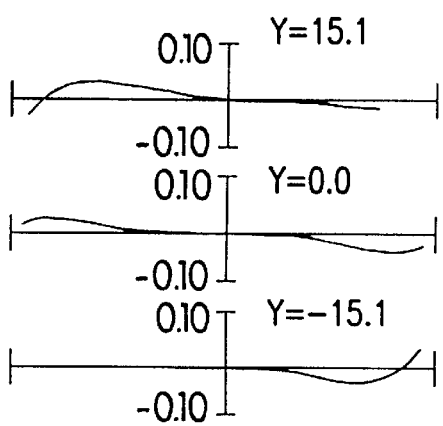
Figure 13F:
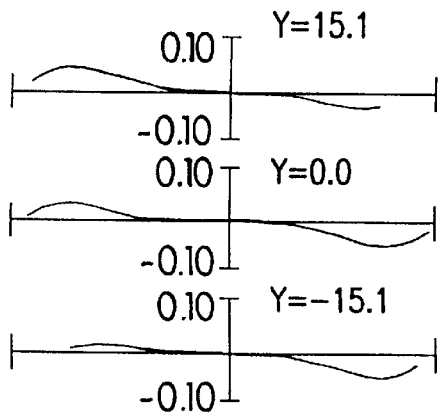
Figure 17A:
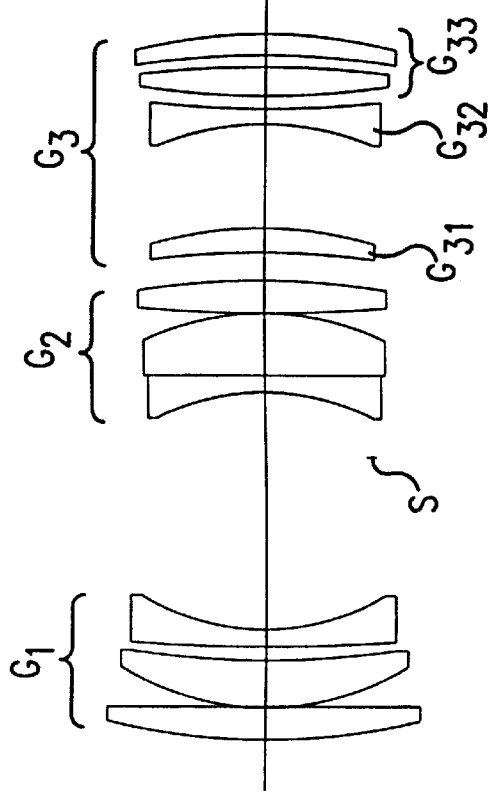
FIGS. 17(A)–(B) show a sixth embodiment corresponding to FIG. 2.
Figure 17B:
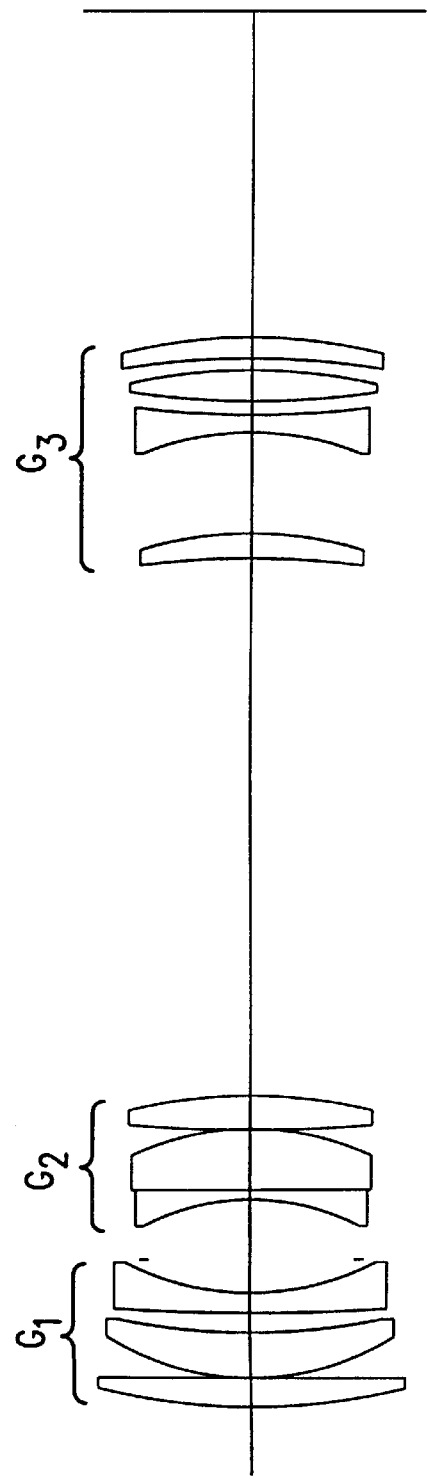

Embodiments of the long focal length microlens system according to the present invention are described hereafter with reference to the accompanying figures. FIGS. 2, 8, 11, 14, 17, 20 and 13 show the lens structure in the first to the eighth embodiments, respectively. In the drawings, (A) is a cross-sectional view in the infinite object shooting state while (B) is a cross-sectional view in the equal magnification shooting state. In each embodiment, three lens groups are structured, in order from the object side, a first group G1 of positive refractive power, a second group G2 of positive refractive power and a third group G3 of negative refractive power. Focusing from the infinite object distance to the closest object distance is accomplished by moving the lens such that the gap between the first group G1 and the second group G2 is minimized and the gap between the second group G2 and the third group G3 is expanded. A diaphragm S is positioned between the first group G1 and the second group G2 to move with the second group G2.

Moreover, the third group G3 includes three subgroups, in order from the object side, a first subgroup G31 of positive refractive power, a second subgroup G32 of negative refractive power and a third subgroup G33 of positive power. In each embodiment, the first subgroup G31 includes a positive meniscus lens while the second subgroup G32 includes a bi-concave lens. Furthermore, the third subgroup G33 includes a bi-convex lens in the first-fifth embodiments and a bi-convex lens and a negative meniscus lens in the sixth-eighth embodiments. The first subgroup G31 and the second subgroup G32 move together in the direction that perpendicularly intersects with the optical axis. By moving the lens groups G31 and G32 a small amount, degradation of the optical performance by vibration at the time of photographing can be decreased. On the other hand, the third group G3 is fixed in the direction of the optical axis. As indicated only in FIG. 2B but adaptable to all the embodiments, a mechanism 12 moves the first subgroup G31 and the second subgroup G32 in the direction that perpendicularly intersects the optical axis.

In the following Tables 1–8, each table shows items of shooting at the infinite object distance, at the infinite object distance, variable gaps in magnification and vibration isolation data. In the Tables titled "At the Time of Shooting at Infinite Object Distance," f, F, and 2ω respectively indicate the focal length, F number and angle of view. Moreover, the first column shows the number of lens surfaces from the object side, the second column shows the radius of curvature of a lens surface r, the third column shows gaps/thickness of lens surfaces d, the fourth column shows values for d-lines ($\lambda$=587.6 nm) of Abbe number υ, the fifth column shows values for the d-lines and the sixth column shows the lens group numbers. Furthermore, in the Tables titled "Variable Gaps at Magnification," f(β), D0, d6, and d11 show focal length, distance from the first lens surface to the object, the lens apexes gap D1 between the first group G1 and the second group G2, and the lens apexes gap D2 between the second group G2 and the third group G3, respectively.

In addition, Table 9 shows the corresponding values for Equations (1)–(4).

TABLE 1

At the Time of the Infinite Object Shooting:
f = 90, F = 2.8, 2ω = 27°

| | r | d | ν | n | |
|---|---|---|---|---|---|
| 1 | 75.900 | 3.70 | 53.8 | 1.69350 | $G_1$ |
| 2 | −4335.526 | 6.40 | | | |
| 3 | 28.391 | 4.90 | 55.6 | 1.6968 | $G_1$ |
| 4 | 73.480 | 0.85 | | | |
| 5 | 169.430 | 1.70 | 33.80 | 1.64831 | $G_1$ |
| 6 | 24.338 | 21.98 | (variable) | | |
| 7 | −25.585 | 1.70 | 35.6 | 1.62588 | $G_2$ |
| 8 | −270.000 | 6.20 | 53.8 | 1.69350 | $G_2$ |
| 9 | −34.992 | 0.10 | | | |

TABLE 1-continued

At the Time of the Infinite Object Shooting:
f = 90, F = 2.8, 2ω = 27°

|    | r        | d     | ν           | n       |          |
|----|----------|-------|-------------|---------|----------|
| 10 | 195.639  | 3.70  | 53.8        | 1.69350 | $G_2$    |
| 11 | −63.146  | 0.90  | (variable)  |         |          |
| 12 | −78.903  | 3.00  | 25.5        | 1.80458 | $G_{31}$ |
| 13 | −46.500  | 10.90 |             |         |          |
| 14 | −34.000  | 2.40  | 39.6        | 1.80454 | $G_{32}$ |
| 15 | 117.000  | 1.50  |             |         |          |
| 16 | 91.000   | 3.80  | 46.8        | 1.76684 | $G_{33}$ |
| 17 | −116.394 |       |             |         |          |

Variable Gap at Magnification

| f (β) | 90.0000  | −0.5000  | −1.0000  |
|-------|----------|----------|----------|
| DO    | ∞        | 210.8725 | 125.3756 |
| d 6   | 21.9815  | 16.1794  | 12.4041  |
| d11   | 0.9025   | 29.9131  | 57.2404  |

Vibration Isolation Data

|                                              | Infinity | Magnification of ½ | Equal magnification |
|----------------------------------------------|----------|--------------------|---------------------|
| Amount of movement of $G_{31}$ and $G_{32}$ (mm) | 0.3      | 0.3                | 0.3                 |
| Amount of movement of image                  | 0.245    | 0.245              | 0.245               |

TABLE 2

At the time of the Infinite Object Shooting:
f = 90, F = 2.9, 2ω = 27°

|    | r         | d     | ν           | n       |          |
|----|-----------|-------|-------------|---------|----------|
| 1  | 76.100    | 3.70  | 53.8        | 1.69350 | $G_1$    |
| 2  | −4335.526 | 6.40  |             |         |          |
| 3  | 28.271    | 4.90  | 55.6        | 1.6968  | $G_1$    |
| 4  | 73.480    | 0.85  |             |         |          |
| 5  | 169.430   | 1.70  | 33.80       | 1.64831 | $G_1$    |
| 6  | 24.242    | 21.96 | (variable)  |         |          |
| 7  | −25.586   | 1.70  | 35.6        | 1.62588 | $G_2$    |
| 8  | −270.000  | 6.20  | 53.8        | 1.69350 | $G_2$    |
| 9  | −34.992   | 0.10  |             |         |          |
| 10 | 195.639   | 3.70  | 53.8        | 1.69350 | G2       |
| 11 | −63.146   | 0.90  | (variable)  |         |          |
| 12 | −78.904   | 3.00  | 25.8        | 1.78472 | $G_{31}$ |
| 13 | −46.000   | 10.90 |             |         |          |
| 14 | −33.880   | 1.70  | 39.6        | 1.80454 | $G_{32}$ |
| 15 | 107.122   | 0.85  |             |         |          |
| 16 | 92.500    | 4.00  | 46.8        | 1.76684 | $G_{33}$ |
| 17 | −105.185  |       |             |         |          |

Variable Gap at Magnification

| f (β) | 90.0000  | −0.5000  | −1.0000  |
|-------|----------|----------|----------|
| DO    | ∞        | 211.0038 | 125.4200 |
| d 6   | 21.9558  | 16.7368  | 12.3784  |
| d11   | 0.9025   | 29.8968  | 57.2403  |

Vibration Isolation Data

|                                              | Infinity | Magnification of ½ | Equal magnification |
|----------------------------------------------|----------|--------------------|---------------------|
| Amount of movement of $G_{31}$ and $G_{32}$ (mm) | 0.3      | 0.3                | 0.3                 |
| Amount of movement of image                  | 0.254    | 0.254              | 0.254               |

TABLE 3

At the Time of the Infinite Object Shooting:
f = 105, F = 2.9, 2ω = 23°

|    | r         | d     | ν           | n       |          |
|----|-----------|-------|-------------|---------|----------|
| 1  | 88.800    | 4.30  | 53.8        | 1.69350 | $G_1$    |
| 2  | −4656.700 | 7.70  |             |         |          |
| 3  | 33.123    | 6.00  | 55.6        | 1.6968  | $G_1$    |
| 4  | 85.727    | 0.70  |             |         |          |
| 5  | 169.570   | 2.00  | 33.8        | 1.64831 | $G_1$    |
| 6  | 27.675    | 24.72 | (variable)  |         |          |
| 7  | −29.100   | 2.00  | 35.6        | 1.62588 | $G_2$    |
| 8  | −420.000  | 7.50  | 53.8        | 1.69350 | $G_2$    |
| 9  | −42.409   | 0.10  |             |         |          |
| 10 | 258.000   | 4.30  | 53.8        | 1.69350 | $G_2$    |
| 11 | −65.233   | 1.93  | (variable)  |         |          |
| 12 | −92.055   | 3.50  | 25.5        | 1.80458 | $G_{31}$ |
| 13 | −56.029   | 12.96 |             |         |          |
| 14 | −41.900   | 2.00  | 40.9        | 1.79631 | $G_{32}$ |
| 15 | 83.322    | 1.00  |             |         |          |
| 16 | 105.000   | 5.00  | 46.8        | 1.76684 | $G_{33}$ |
| 17 | −89.469   |       |             |         |          |

Variable Gap at Magnification

| f (β) | 105.0000 | −0.5000  | −1.0000  |
|-------|----------|----------|----------|
| DO    | ∞        | 246.0061 | 147.7472 |
| d 6   | 24.7240  | 16.9327  | 9.7211   |
| d11   | 1.9262   | 35.8015  | 67.1566  |

Vibration Isolation Data

|                                              | Infinity | Magnification of ½ | Equal magnification |
|----------------------------------------------|----------|--------------------|---------------------|
| Amount of movement of $G_{31}$ and $G_{32}$ (mm) | 0.3      | 0.3                | 0.3                 |
| Amount of movement of image                  | 0.288    | 0.288              | 0.288               |

TABLE 4

At the Time of the Infinite Object Shooting:
f = 105, F = 2.9, 2ω = 23°

|   | r         | d    | ν    | n       |       |
|---|-----------|------|------|---------|-------|
| 1 | 88.800    | 4.30 | 53.8 | 1.69350 | $G_1$ |
| 2 | −5058.143 | 7.50 |      |         |       |
| 3 | 33.123    | 5.70 | 55.6 | 1.6968  | $G_1$ |
| 4 | 85.727    | 1.00 |      |         |       |

TABLE 4-continued

At the Time of the Infinite Object Shooting:
$f = 105, F = 2.9, 2\omega = 23°$

| | r | d | ν | n | |
|---|---|---|---|---|---|
| 5 | 197.669 | 2.00 | 33.8 | 1.64831 | $G_1$ |
| 6 | 28.432 | 25.72 | (variable) | | |
| 7 | −29.850 | 2.00 | 35.6 | 1.62588 | $G_2$ |
| 8 | −420.000 | 7.20 | 53.8 | 1.69350 | $G_2$ |
| 9 | −40.824 | 0.10 | | | |
| 10 | 228.247 | 4.30 | 53.8 | 1.69350 | $G_2$ |
| 11 | −73.958 | 1.00 | (variable) | | |
| 12 | −92.055 | 3.50 | 25.5 | 1.80458 | $G_{31}$ |
| 13 | −54.068 | 12.71 | | | |
| 14 | −39.156 | 2.00 | 39.6 | 1.80454 | $G_{32}$ |
| 15 | 124.976 | 1.00 | | | |
| 16 | 110.000 | 5.00 | 46.8 | 1.76684 | $G_{33}$ |
| 17 | −117.281 | | | | |

Variable Gap at Magnification

| f (β) | 105.0000 | −0.5000 | −1.0000 |
|---|---|---|---|
| DO | ∞ | 245.8224 | 146.9039 |
| d 6 | 25.7187 | 17.9274 | 12.6233 |
| d11 | 1.0030 | 34.8783 | 66.4799 |

Vibration Isolation Data

| | Infinity | Magnification of ½ | Equal magnification |
|---|---|---|---|
| Amount of movement of $G_{31}$ and $G_{32}$ (mm) | 0.3 | 0.3 | 0.3 |
| Amount of movement of image | 0.256 | 0.256 | 0.256 |

TABLE 5

At the Time of the Infinite Object Shooting:
$f = 105, F = 2.8, 2\omega = 23°$

| | r | d | ν | n | |
|---|---|---|---|---|---|
| 1 | 90.400 | 4.30 | 53.8 | 1.69350 | $G_1$ |
| 2 | −3813.438 | 5.90 | | | |
| 3 | 33.123 | 6.00 | 53.8 | 1.69350 | $G_1$ |
| 4 | 85.727 | 1.10 | | | |
| 5 | 159.577 | 2.00 | 33.8 | 1.64831 | $G_1$ |
| 6 | 27.507 | 25.89 | (variable) | | |
| 7 | −29.100 | 2.00 | 35.6 | 1.62588 | $G_2$ |
| 8 | −420.000 | 7.50 | 55.6 | 1.69680 | $G_2$ |
| 9 | −42.400 | 0.10 | | | |
| 10 | 255.000 | 4.30 | 53.8 | 1.69350 | $G_2$ |
| 11 | −65.844 | 1.89 | (variable) | | |
| 12 | −92.055 | 3.50 | 25.5 | 1.80458 | $G_{31}$ |
| 13 | −54.837 | 12.10 | | | |
| 14 | −40.908 | 2.00 | 40.9 | 1.79631 | $G_{32}$ |
| 15 | 83.322 | 1.00 | | | |
| 16 | 98.000 | 6.00 | 49.5 | 1.74443 | $G_{33}$ |
| 17 | −86.014 | | | | |

Variable Gap at Magnification

| f (β) | 105.0000 | −0.5000 | −1.0000 |
|---|---|---|---|
| DO | ∞ | 245.7975 | 148.0689 |
| d 6 | 25.8870 | 17.4135 | 9.6196 |
| d11 | 1.8873 | 35.7812 | 66.9568 |

Vibration Isolation Data

| | Infinity | Magnification of ½ | Equal magnification |
|---|---|---|---|
| Amount of movement of $G_{31}$ and $G_{32}$ (mm) | 0.3 | 0.3 | 0.3 |
| Amount of movement of image | 0.298 | 0.298 | 0.297 |

TABLE 6

At the Time of the Infinite Object Shooting:
$f = 105, F = 2.9, 2\omega = 23°$

| | r | d | υ | n | |
|---|---|---|---|---|---|
| 1 | 88.674 | 4.30 | 53.8 | 1.69350 | $G_1$ |
| 2 | −717.850 | 0.10 | | | |
| 3 | 36.500 | 6.00 | 53.8 | 1.69350 | $G_1$ |
| 4 | 83.387 | 1.90 | | | |
| 5 | 178.643 | 2.00 | 33.8 | 1.64831 | $G_1$ |
| 6 | 29.957 | 30.61 | (variable) | | |
| 7 | −26.755 | 2.00 | 33.8 | 1.64831 | $G_2$ |
| 8 | −270.000 | 7.50 | 53.8 | 1.69350 | $G_2$ |
| 9 | −36.626 | 0.10 | | | |
| 10 | 385.955 | 4.30 | 50.3 | 1.72000 | $G_2$ |
| 11 | −66.238 | 3.31 | (variable) | | |
| 12 | −93.000 | 3.50 | 25.4 | 1.80518 | $G_{31}$ |
| 13 | −53.686 | 12.66 | | | |
| 14 | −38.635 | 2.00 | 40.9 | 1.79631 | $G_{32}$ |
| 15 | 96.487 | 1.50 | | | |
| 16 | 89.922 | 4.20 | 52.3 | 1.74810 | $G_{33}$ |
| 17 | −83.000 | 1.00 | | | |
| 18 | −83.000 | 2.5 | 31.7 | 1.75692 | $G_{33}$ |
| 19 | −108.548 | | | | |

Variable Gap at Magnification

Variable Gap at Magnification

| f (β) | 105.0000 | −0.5000 | −1.0000 |
|---|---|---|---|
| DO | ∞ | 242.7623 | 145.8146 |
| d 6 | 30.6126 | 21.1146 | 12.4594 |
| d11 | 3.3078 | 37.2296 | 68.1411 |

Vibration Isolation Data

Vibration Isolation Data

|  | Infinity | Magnification of ½ | Equal magnification |
|---|---|---|---|
| Amount of movement of $G_{31}$ and $G_{32}$ (mm) | 0.3 | 0.3 | 0.3 |
| Amount of movement of image | 0.277 | 0.277 | 0.277 |

TABLE 7

At the Time of the Infinite Object Shooting:
$f = 105, F = 2.9, 2\omega = 23°$

|  | r | d | υ | n |  |
|---|---|---|---|---|---|
| 1 | 88.674 | 4.30 | 53.8 | 1.69350 | $G_1$ |
| 2 | −800.009 | 0.10 |  |  |  |
| 3 | 36.500 | 6.00 | 53.8 | 1.69350 | $G_1$ |
| 4 | 83.387 | 1.90 |  |  |  |
| 5 | 173.535 | 2.00 | 33.8 | 1.64831 | $G_1$ |
| 6 | 29.991 | 30.75 (variable) |  |  |  |
| 7 | −26.755 | 2.00 | 33.8 | 1.64831 | $G_2$ |
| 8 | −270.000 | 7.50 | 53.8 | 1.69350 | $G_2$ |
| 9 | −36.462 | 0.10 |  |  |  |
| 10 | 367.944 | 4.30 | 50.3 | 1.72000 | $G_2$ |
| 11 | −67.297 | 3.26 (variable) |  |  |  |
| 12 | −93.000 | 3.50 | 25.4 | 1.80518 | $G_{31}$ |
| 13 | −53.894 | 12.66 |  |  |  |
| 14 | −38.807 | 2.00 | 40.9 | 1.79631 | $G_{32}$ |
| 15 | 99.540 | 1.50 |  |  |  |
| 16 | 96.000 | 4.20 | 52.3 | 1.74810 | $G_{33}$ |
| 17 | −83.000 | 1.00 |  |  |  |
| 18 | −83.000 | 2.5 | 31.7 | 1.75692 | $G_{33}$ |
| 19 | −104.056 |  |  |  |  |

Variable Gap at Magnification

Variable Gap at Magnification

| f (β) | 105.0000 | −0.5000 | −1.0000 |
|---|---|---|---|
| DO | ∞ | 242.5179 | 146.0814 |
| d 6 | 30.7473 | 20.5653 | 11.3437 |
| d11 | 3.2640 | 37.2041 | 67.9428 |

Vibration Isolation Data

Vibration Isolation Data

|  | Infinity | Magnification of ½ | Equal magnification |
|---|---|---|---|
| Amount of movement of $G_{31}$ and $G_{32}$ (mm) | 0.3 | 0.3 | 0.3 |
| Amount of movement of image | 0.274 | 0.274 | 0.273 |

TABLE 8

At the Time of the Infinite Object Shooting:
$f = 105, F = 2.9, 2\omega = 23°$

|  | r | d | υ | n |  |
|---|---|---|---|---|---|
| 1 | 88.674 | 4.30 | 53.8 | 1.69350 | $G_1$ |
| 2 | −894.243 | 0.10 |  |  |  |

TABLE 8-continued

At the Time of the Infinite Object Shooting:
$f = 105, F = 2.9, 2\omega = 23°$

|  | r | d | υ | n |  |
|---|---|---|---|---|---|
| 3 | 36.500 | 6.00 | 53.8 | 1.69350 | $G_1$ |
| 4 | 83.387 | 1.90 |  |  |  |
| 5 | 169.489 | 2.00 | 33.8 | 1.64831 | $G_1$ |
| 6 | 30.035 | 30.84 (variable) |  |  |  |
| 7 | −26.755 | 2.00 | 33.8 | 1.64831 | $G_2$ |
| 8 | −270.000 | 7.50 | 53.8 | 1.69350 | $G_2$ |
| 9 | −36.687 | 0.10 |  |  |  |
| 10 | 348.219 | 4.30 | 50.3 | 1.72000 | $G_2$ |
| 11 | −67.264 | 3.27 (variable) |  |  |  |
| 12 | −93.000 | 3.50 | 25.4 | 1.80518 | $G_{31}$ |
| 13 | −53.725 | 12.66 |  |  |  |
| 14 | −38.700 | 2.00 | 40.9 | 1.79631 | $G_{32}$ |
| 15 | 106.415 | 1.50 |  |  |  |
| 16 | 103.000 | 4.20 | 52.3 | 1.74810 | $G_{33}$ |
| 17 | −83.000 | 1.00 |  |  |  |
| 18 | −83.000 | 2.5 | 31.7 | 1.75692 | $G_{33}$ |
| 19 | −104.121 |  |  |  |  |

Variable Gap at Magnification

Variable Gap at Magnification

| f (β) | 105.0000 | −0.5000 | −1.0000 |
|---|---|---|---|
| DO | ∞ | 242.2346 | 146.5513 |
| d 6 | 30.8408 | 19.6316 | 9.5717 |
| d11 | 3.2665 | 37.2339 | 67.7185 |

Vibration Isolation Data

Vibration Isolation Data

|  | Infinity | Magnification of ½ | Equal magnification |
|---|---|---|---|
| Amount of movement $G_{31}$ and $G_{32}$ (mm) | 0.3 | 0.3 | 0.3 |
| Amount of movement of image | 0.266 | 0.266 | 0.265 |

TABLE 9

| Conditional Formula Number | (1) $|\Delta D1|/\Delta D2$ | | (2) M | (3) N | (4) $f_{31}/|f_3|$ |
|---|---|---|---|---|---|
| Embodiment Number | ½ magnification | Equal magnification | | | |
| 1 | 0.2 | 0.17 | 0.825 | 0.564 | 0.853 |
| 2 | 0.18 | 0.17 | 0.812 | 0.454 | 0.853 |
| 3 | 0.23 | 0.23 | 0.818 | 0.393 | 0.906 |
| 4 | 0.23 | 0.2 | 0.809 | 0.491 | 0.881 |
| 5 | 0.25 | 0.25 | 0.829 | 0.372 | 0.809 |
| 6 | 0.28 | 0.28 | 0.810 | 0.407 | 0.803 |
| 7 | 0.30 | 0.30 | 0.809 | 0.369 | 0.802 |
| 8 | 0.33 | 0.33 | 0.802 | 0.310 | 0.802 |

Figure 3A:
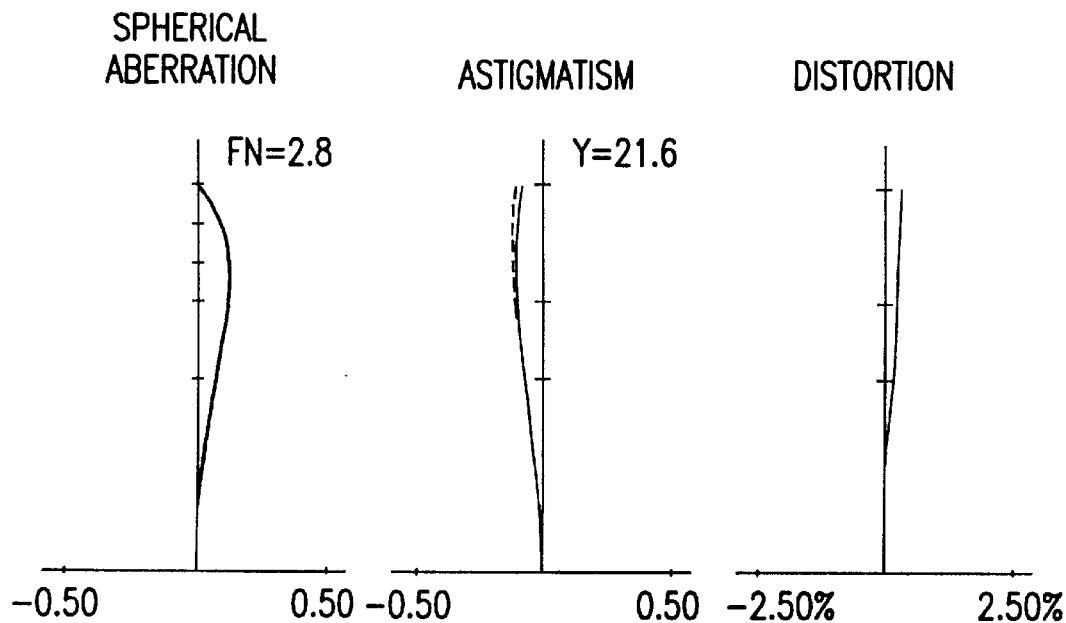
FIGS. 3(A)–(C) show the aberration at the time of shooting at the infinite object distance, at ½ magnification and at equal magnification.
Figure 3B:
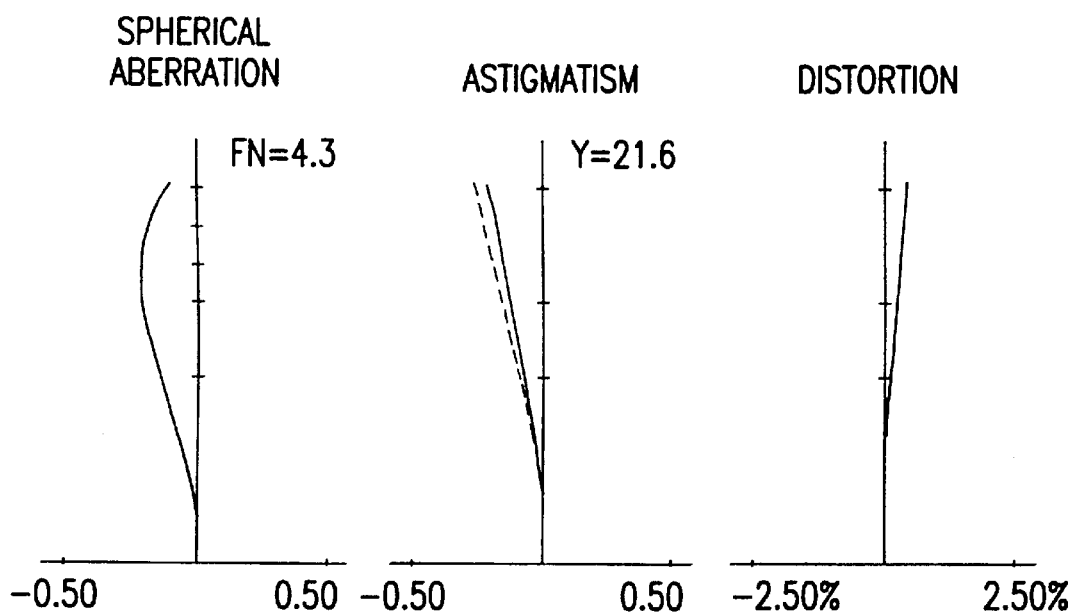
Figure 3C:
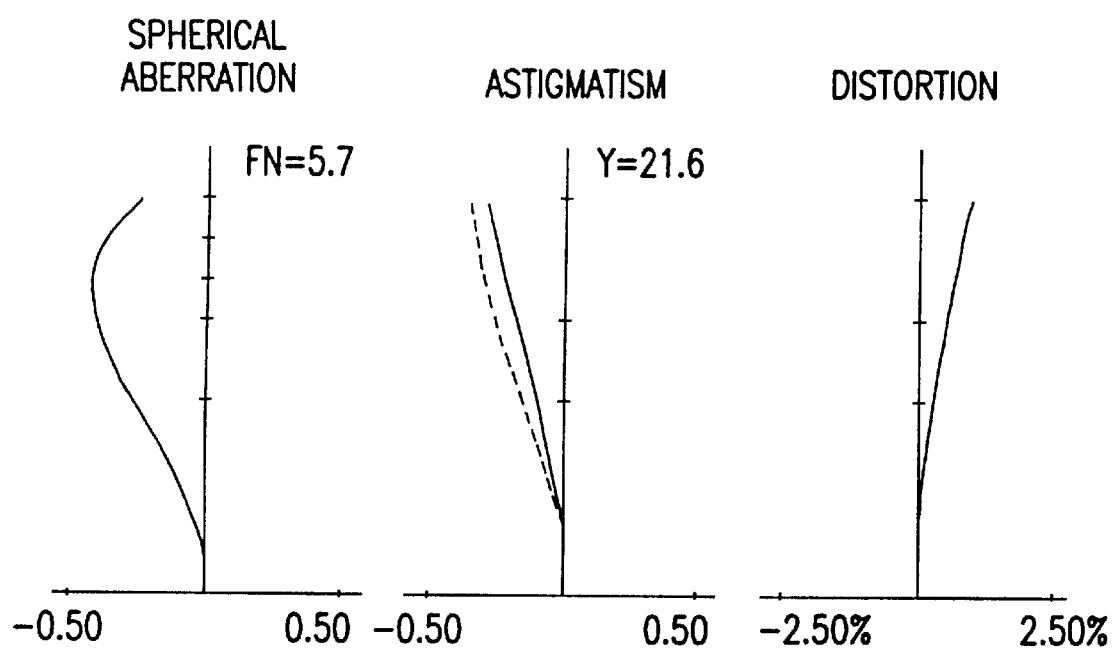
Figure 5A:
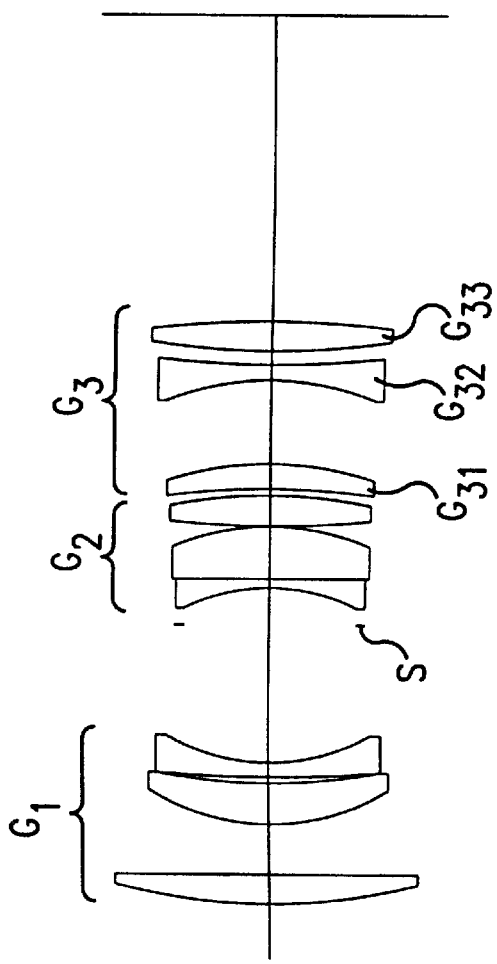
FIGS. 5(A)–(B) is a drawing showing a second embodiment corresponding to FIG. 2.
Figure 5B:
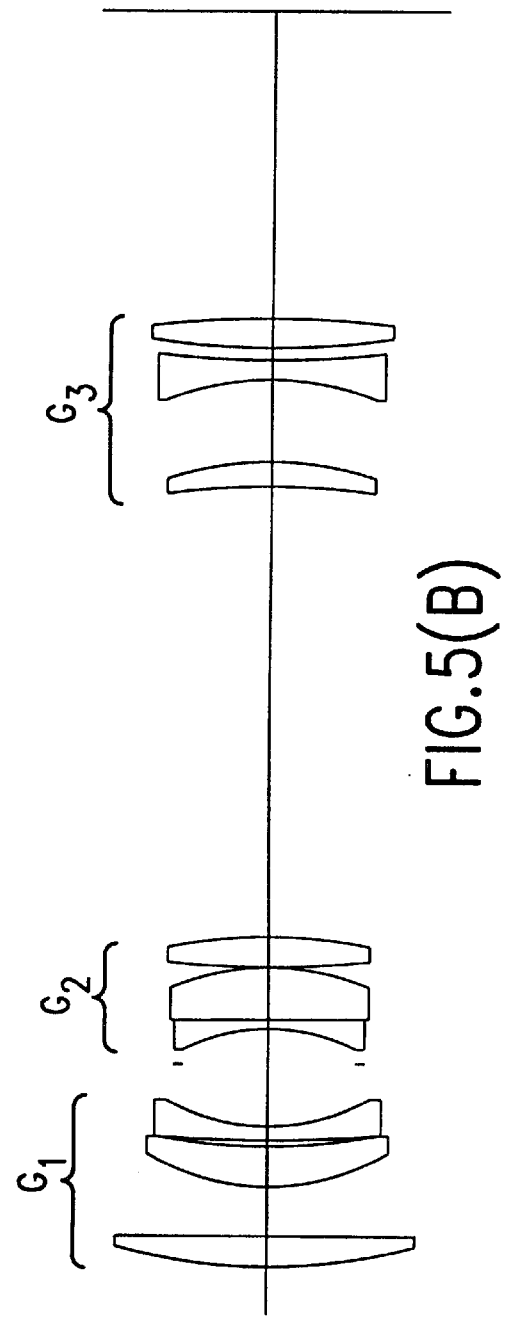
Figure 6A:
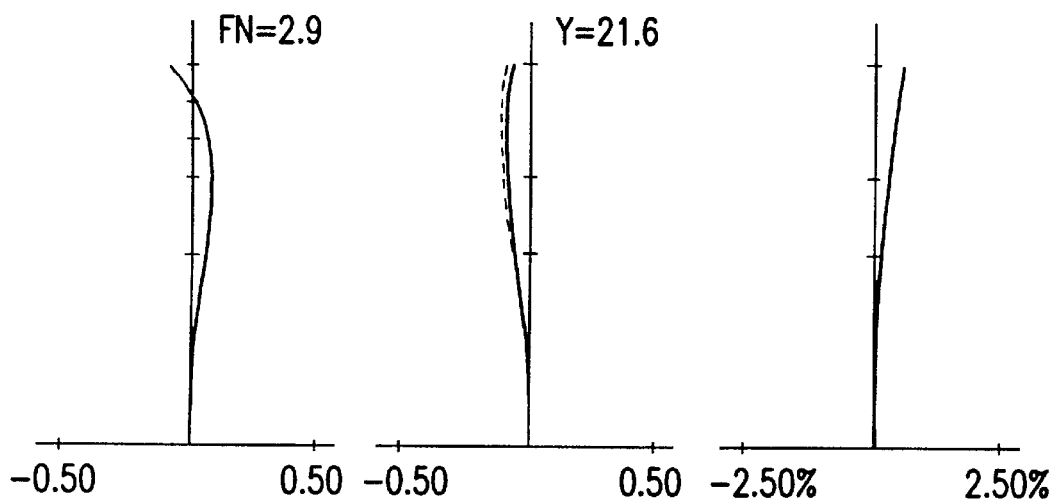
FIGS. 6(A)–(C) show the second embodiment corresponding to FIG. 3.
Figure 6B:
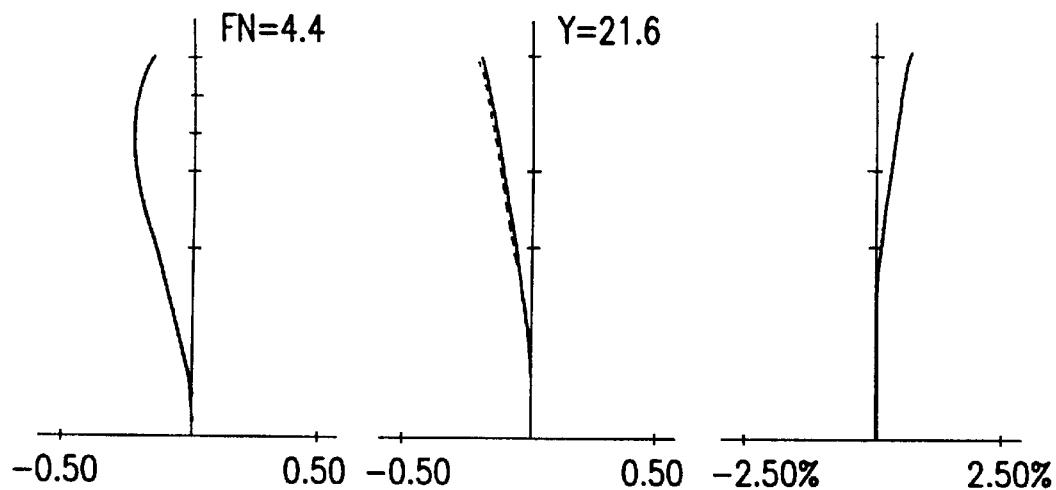
Figure 6C:
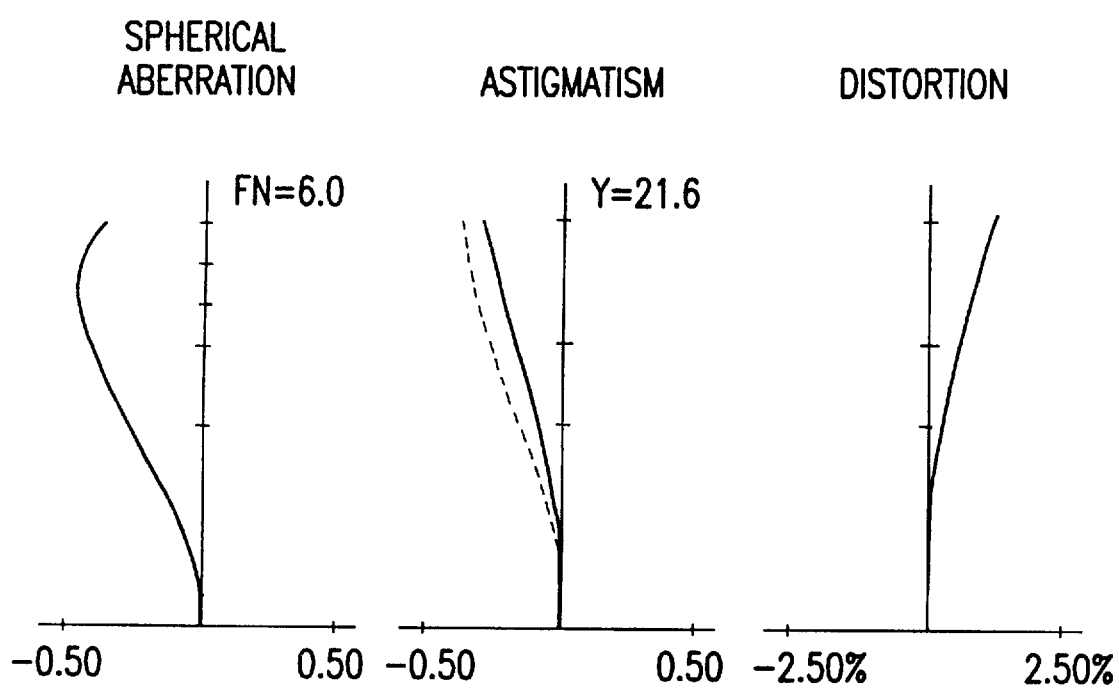
Figure 7A:
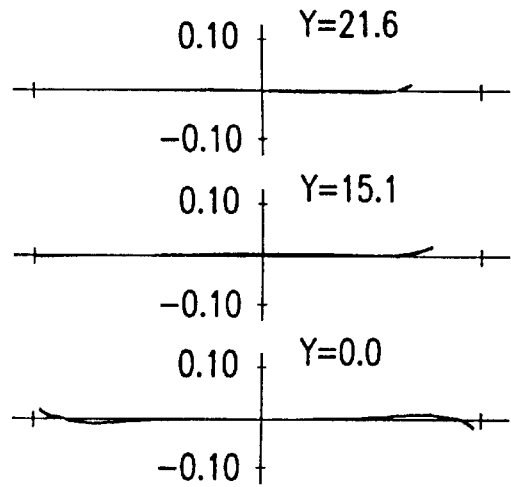
FIGS. 7(A)–(F) show the second embodiment corresponding to FIG. 4.
Figure 7B:
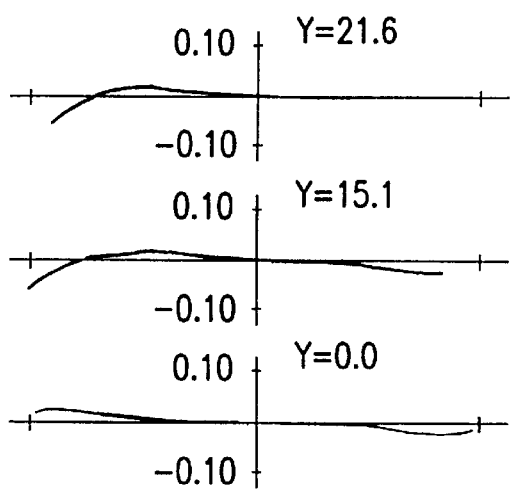
Figure 7C:
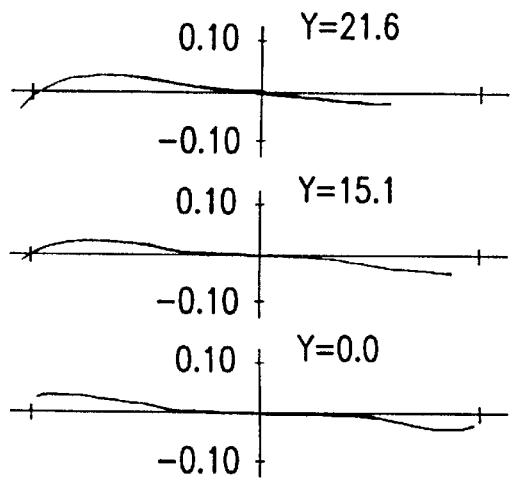
Figure 7D:
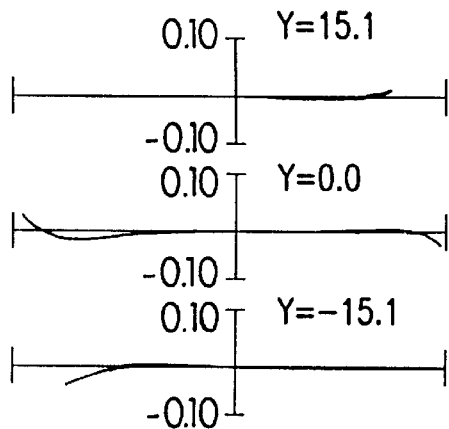
Figure 7E:
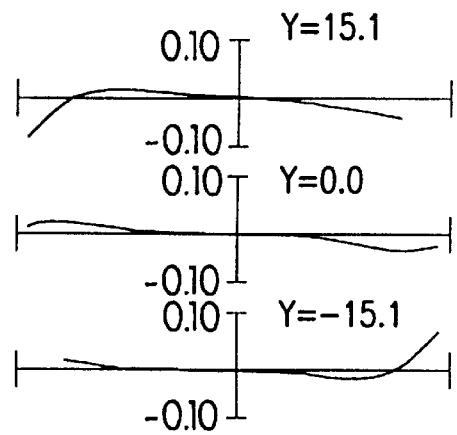
Figure 7F:
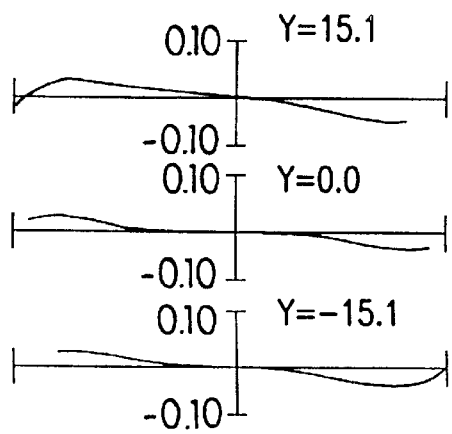
Figure 9A:
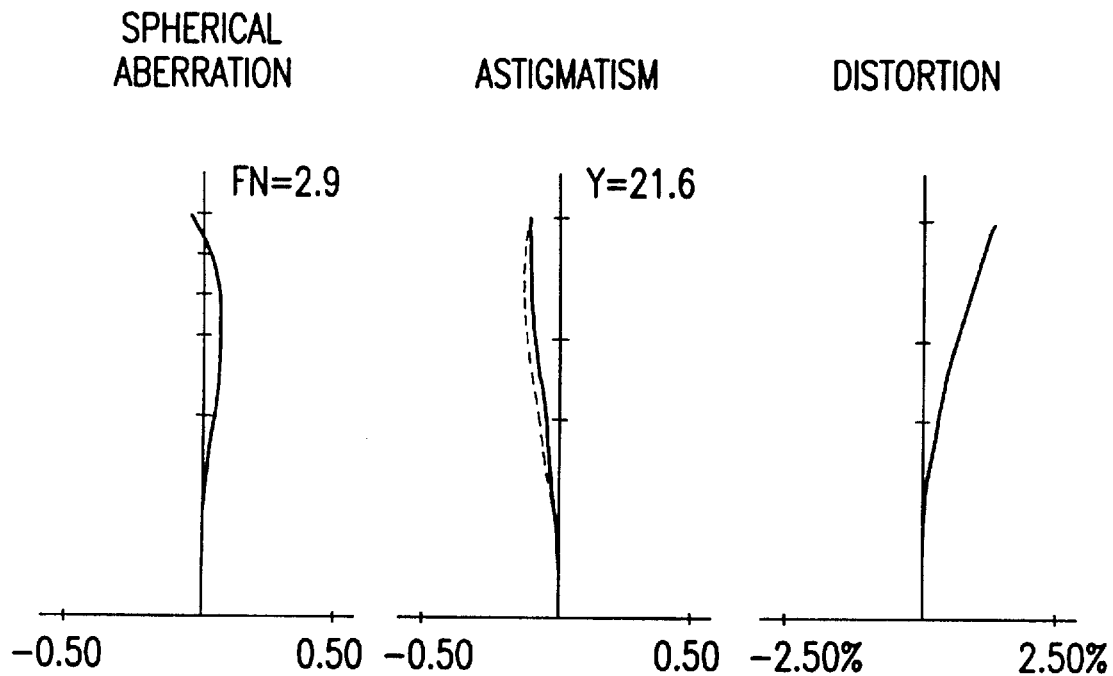
FIGS. 9(A)–(C) show the third embodiment corresponding to FIG. 3.
Figure 9B:
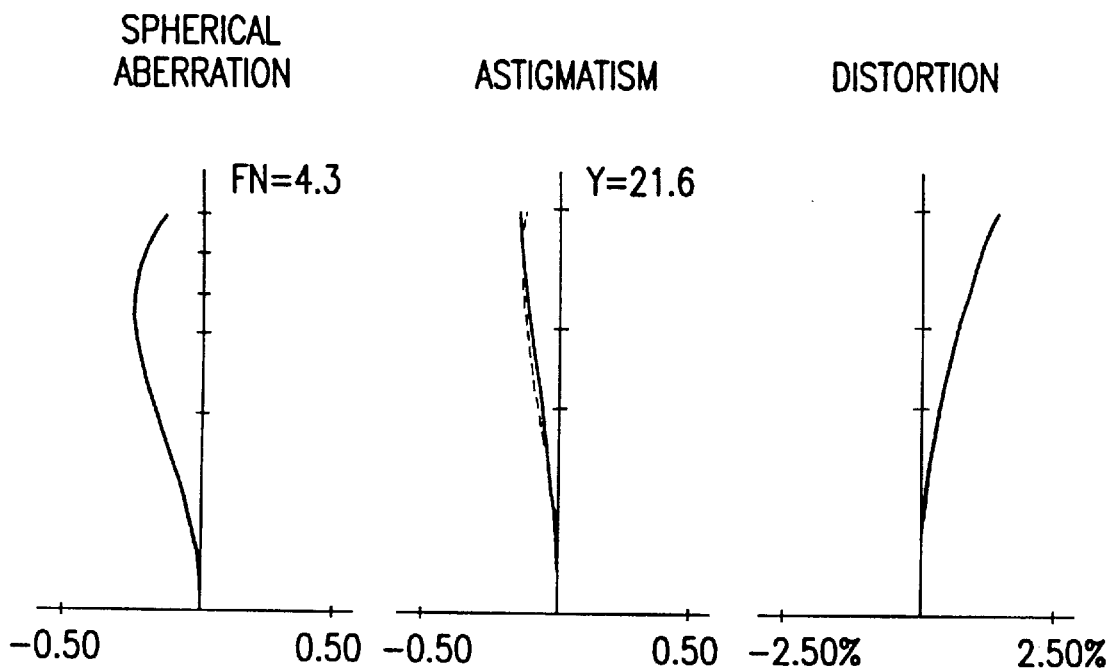
Figure 9C:
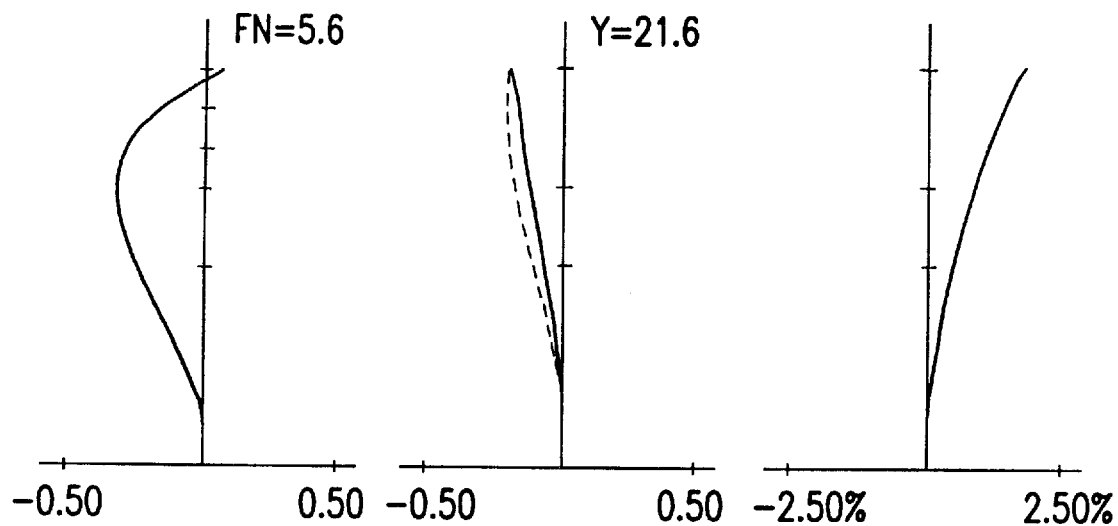
Figure 10A:
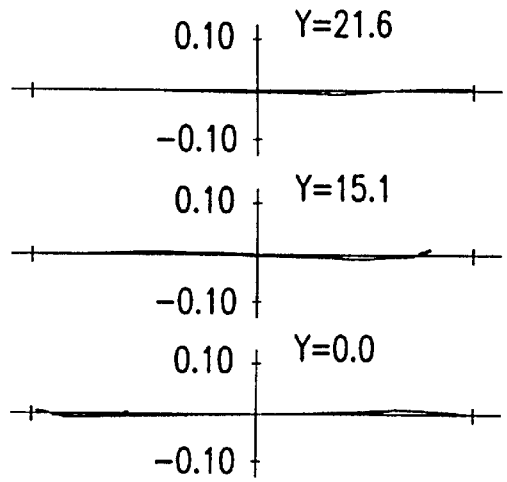
FIGS. 10(A)–(F) show the third embodiment corresponding to FIG. 4.
Figure 10B:
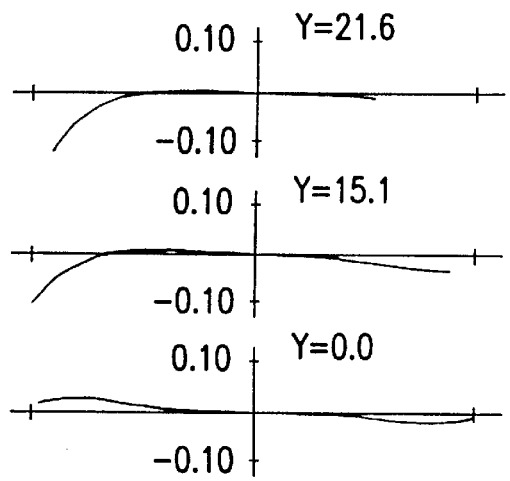
Figure 10C:
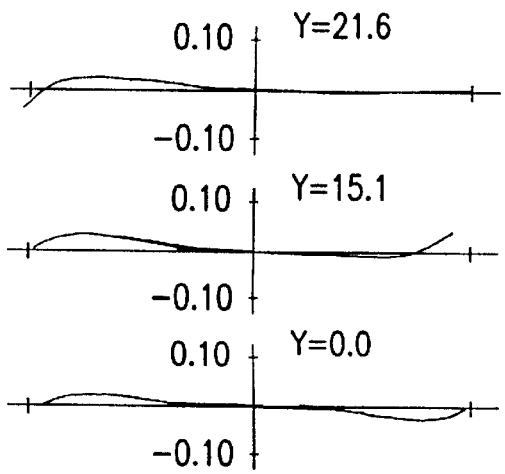
Figure 10D:
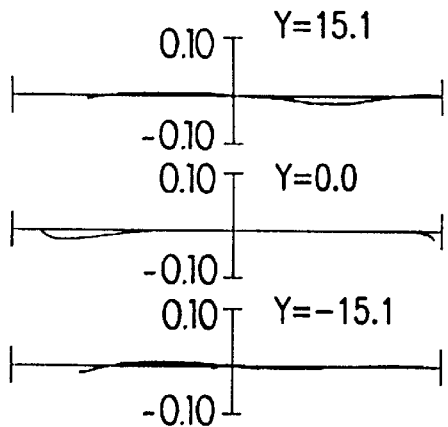
Figure 10E:
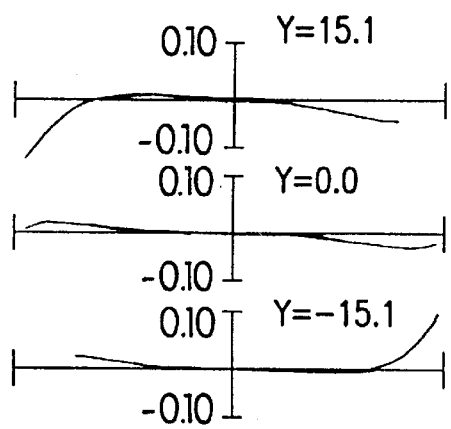
Figure 10F:
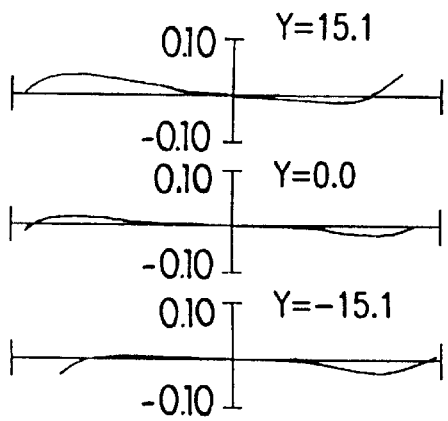
Figure 12A:
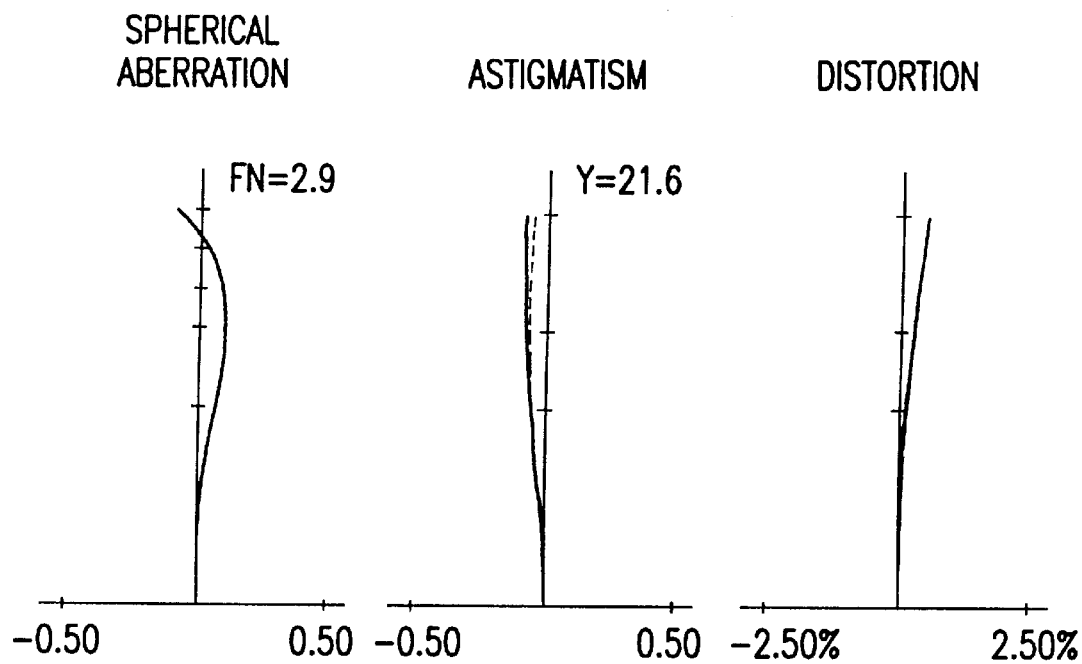
FIGS. 12(A)–(C) show the fourth embodiment corresponding to FIG. 3.
Figure 12B:
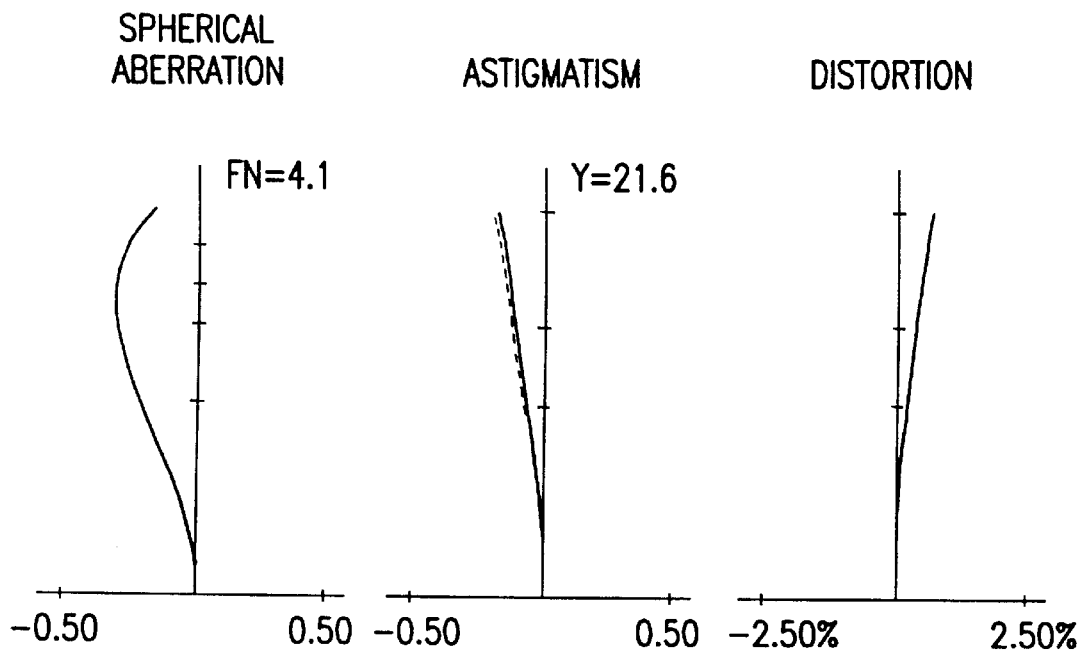
Figure 12C:
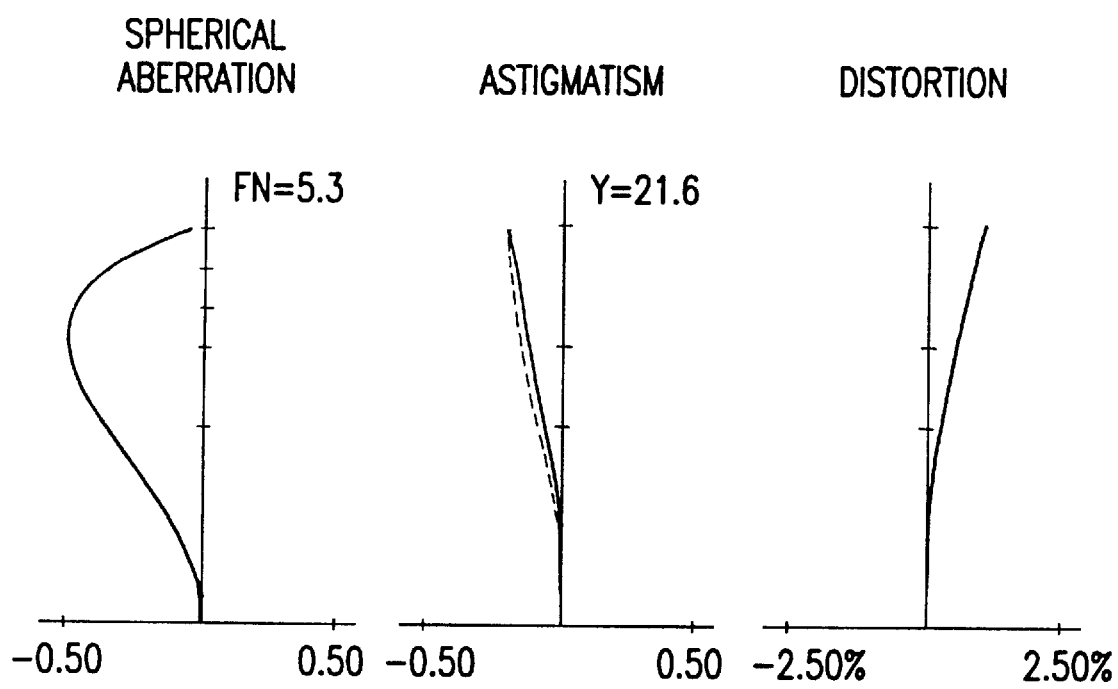
Figure 15A:
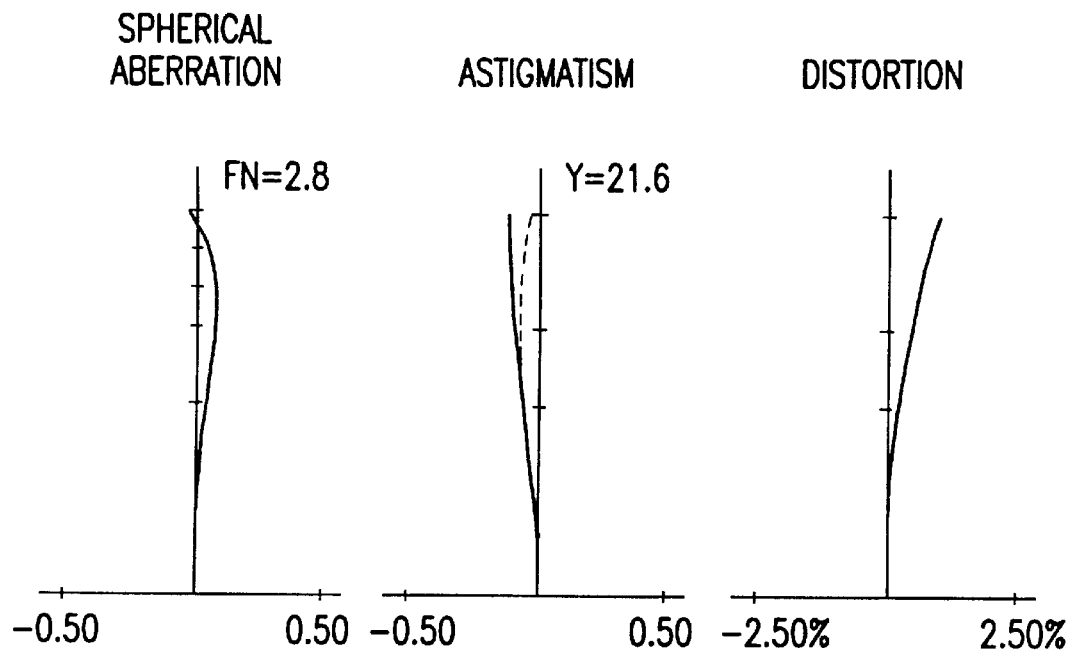
FIGS. 15(A)–(C) show the fifth embodiment corresponding to FIG. 3.
Figure 15B:
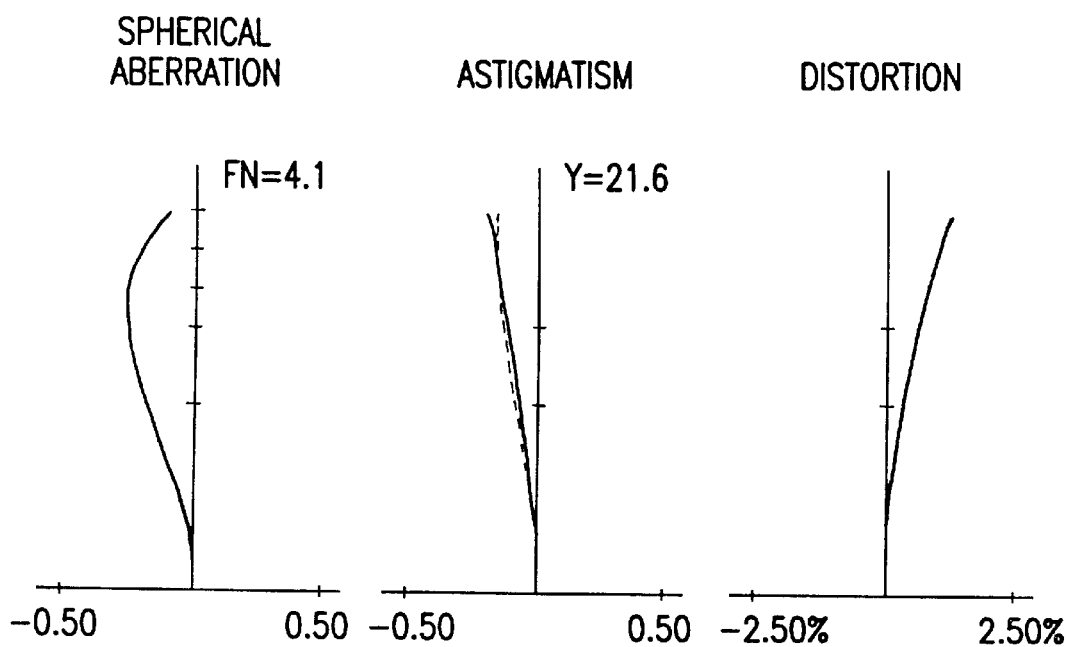
Figure 15C:
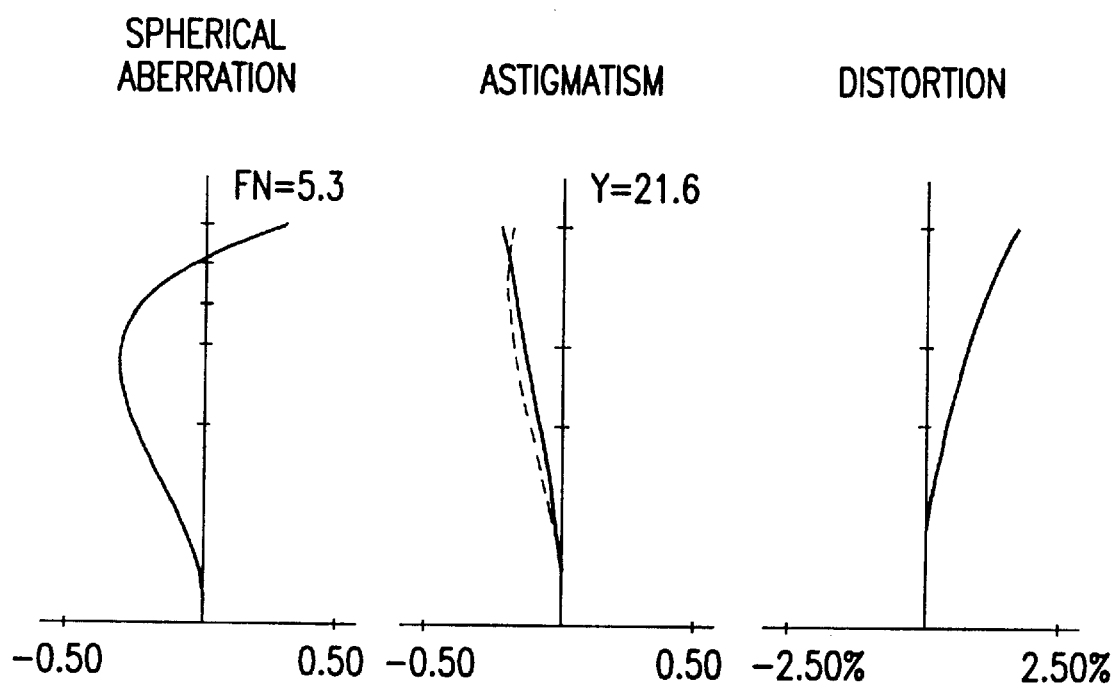
Figure 16A:
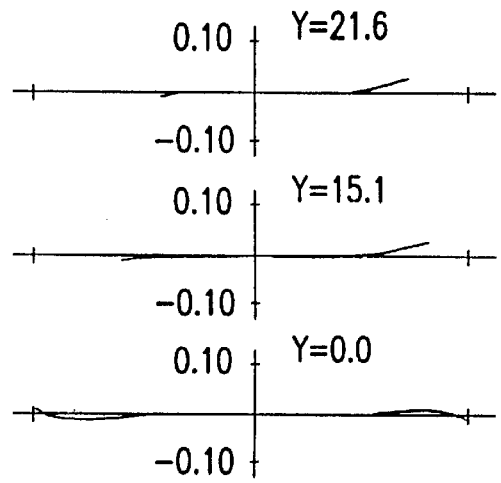
FIGS. 16(A)–(F) show the fifth embodiment corresponding to FIG. 4.
Figure 16B:
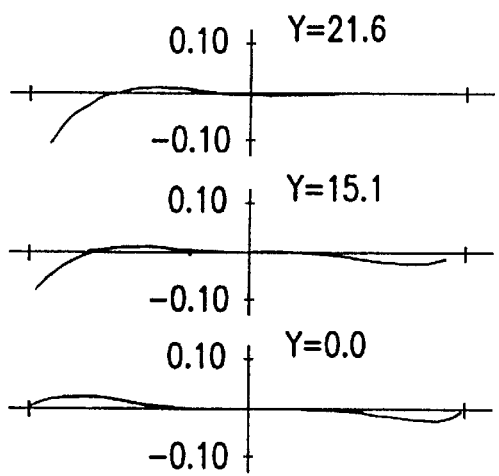
Figure 16C:
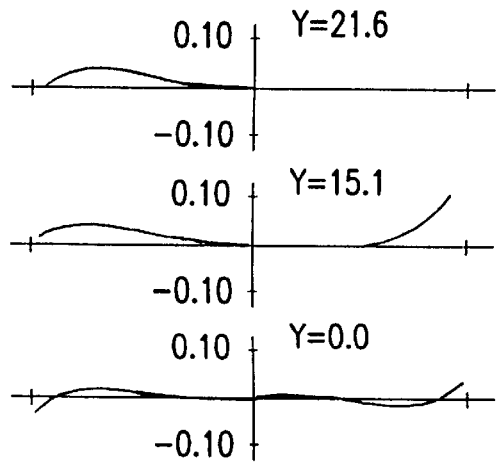
Figure 16D:
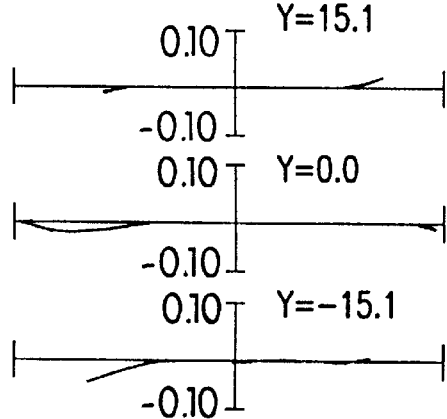
Figure 16E:
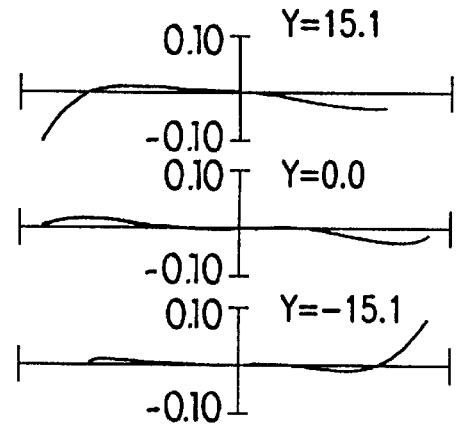
Figure 16F:
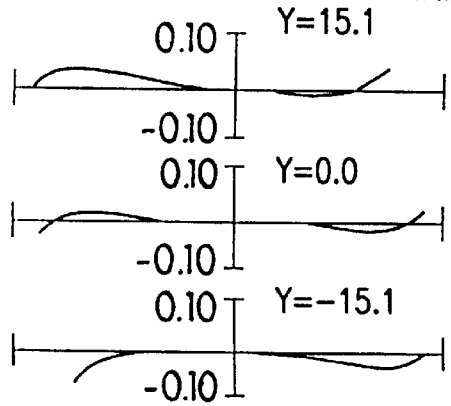
Figure 18A:
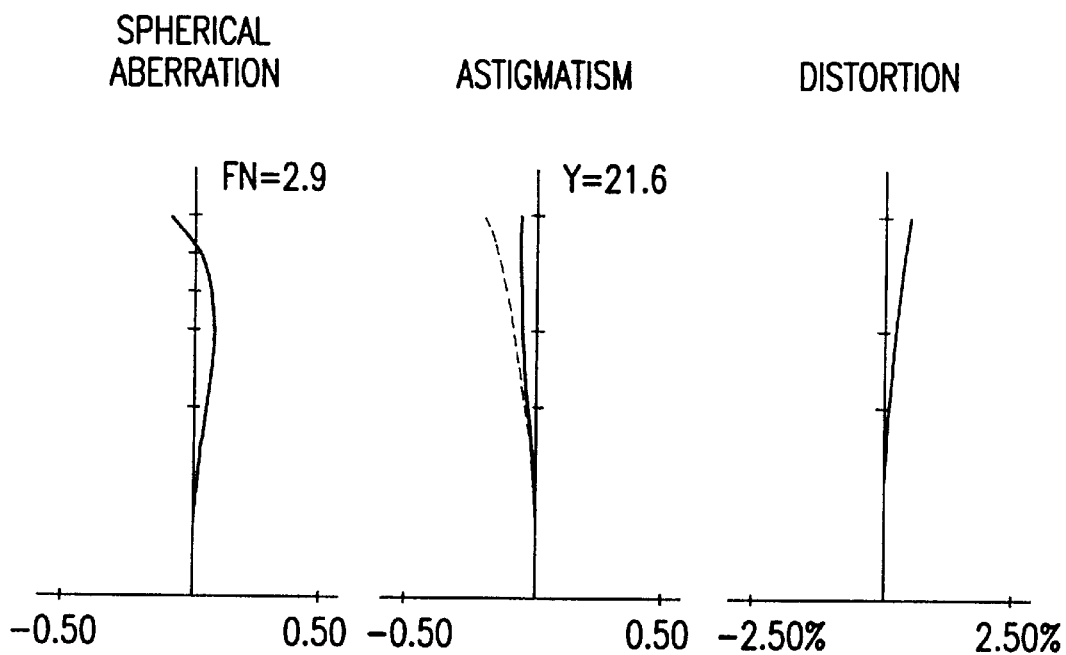
FIGS. 18(A)–(C) show the sixth embodiment corresponding to FIG. 3.
Figure 18B:
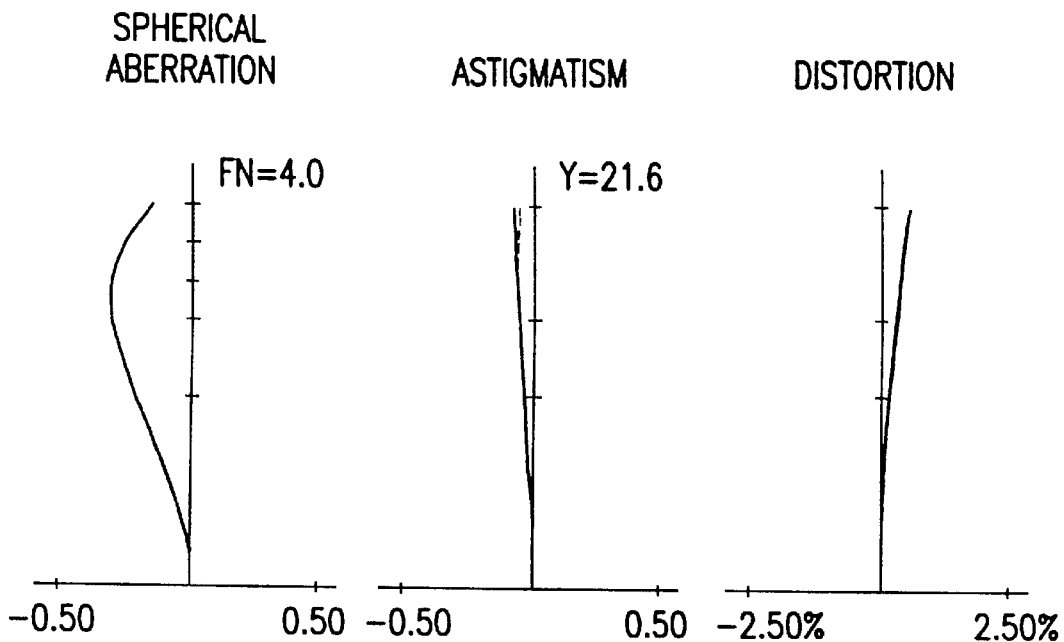
Figure 18C:
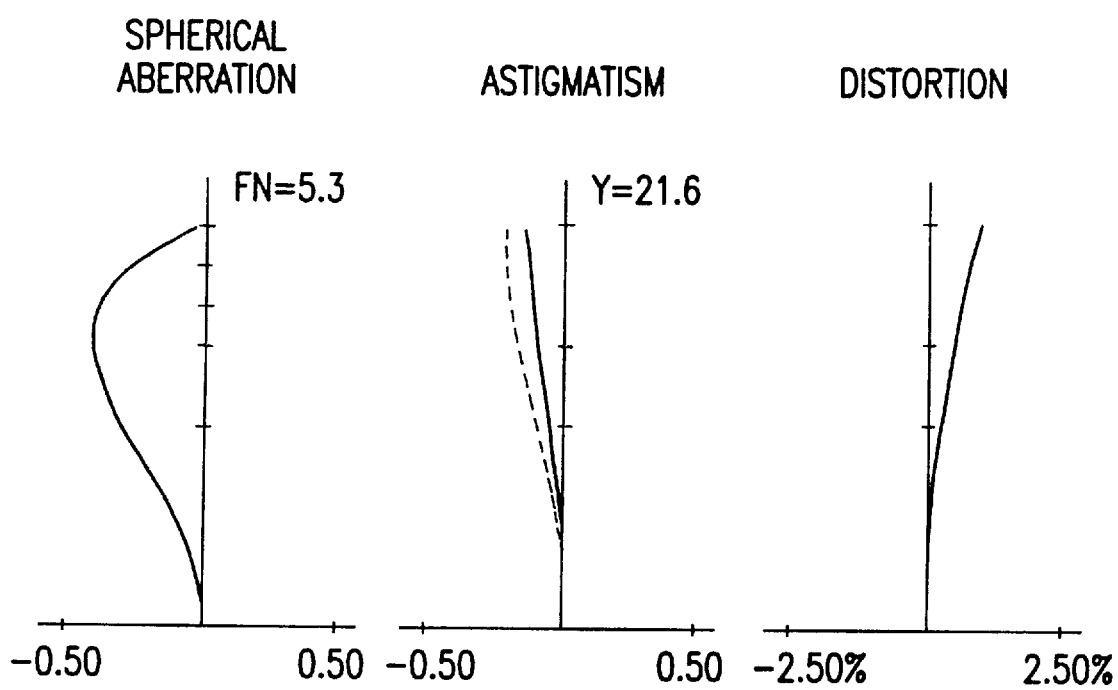
Figure 19A:
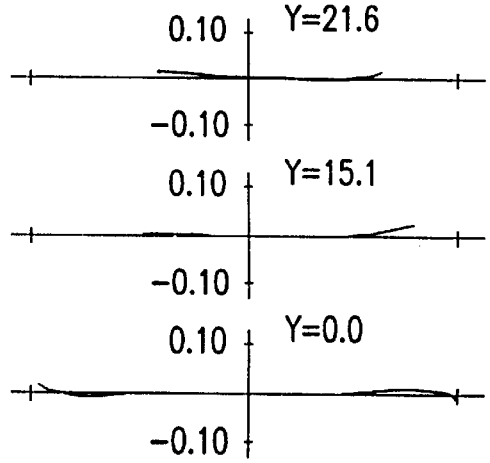
FIGS. 19(A)–(F) show the sixth embodiment corresponding to FIG. 4.
Figure 19B:
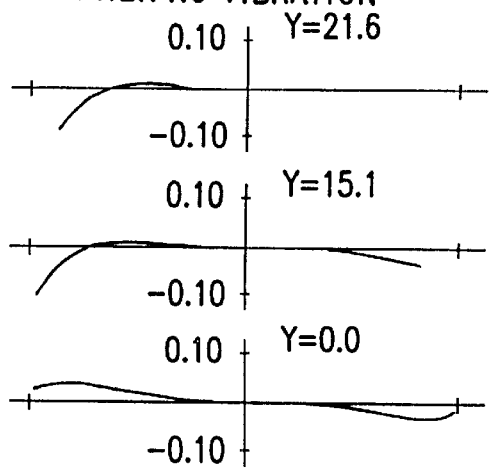
Figure 19C:
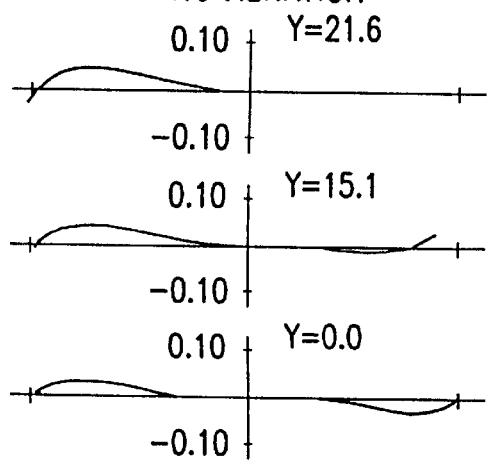
Figure 19D:
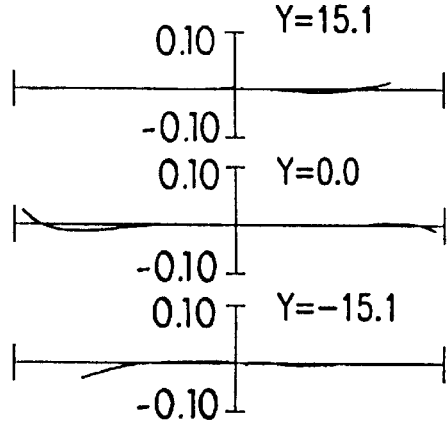
Figure 19E:
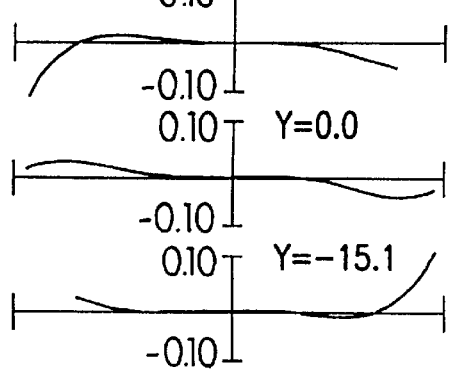
Figure 19F:
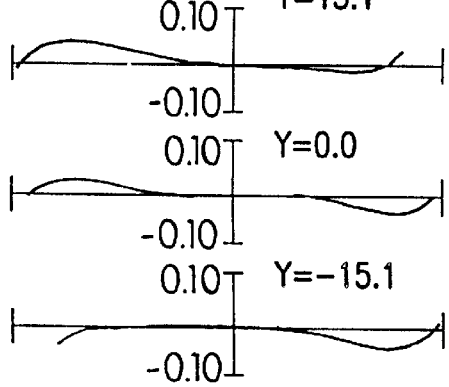
Figure 21A:
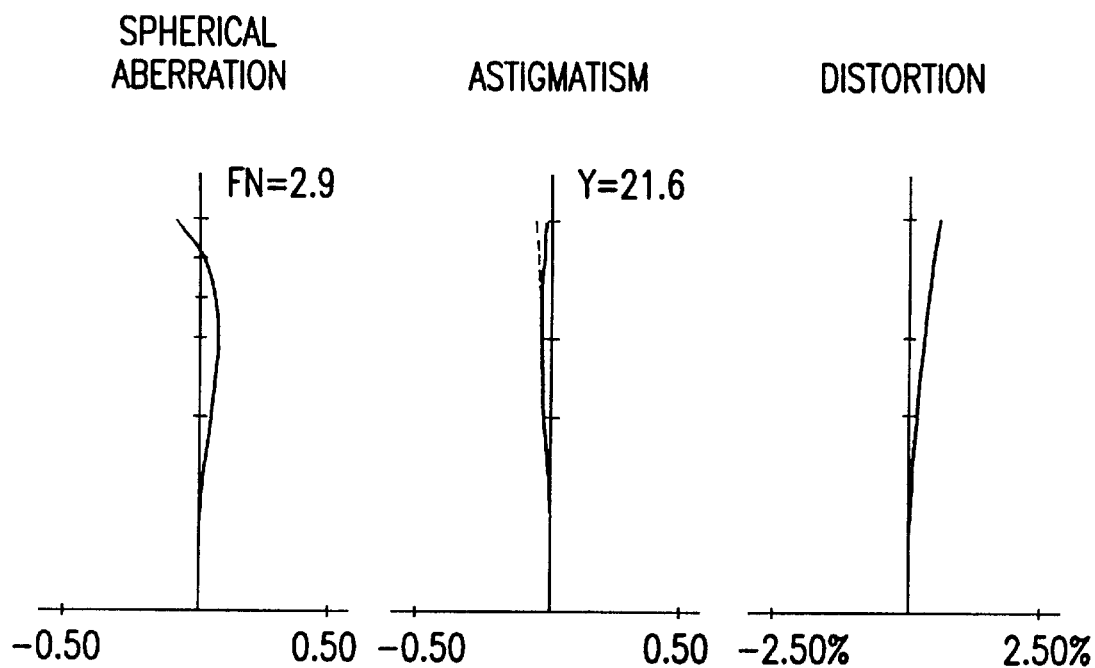
FIGS. 21(A)–(C) show the seventh embodiment corresponding to FIG. 3.
Figure 21B:
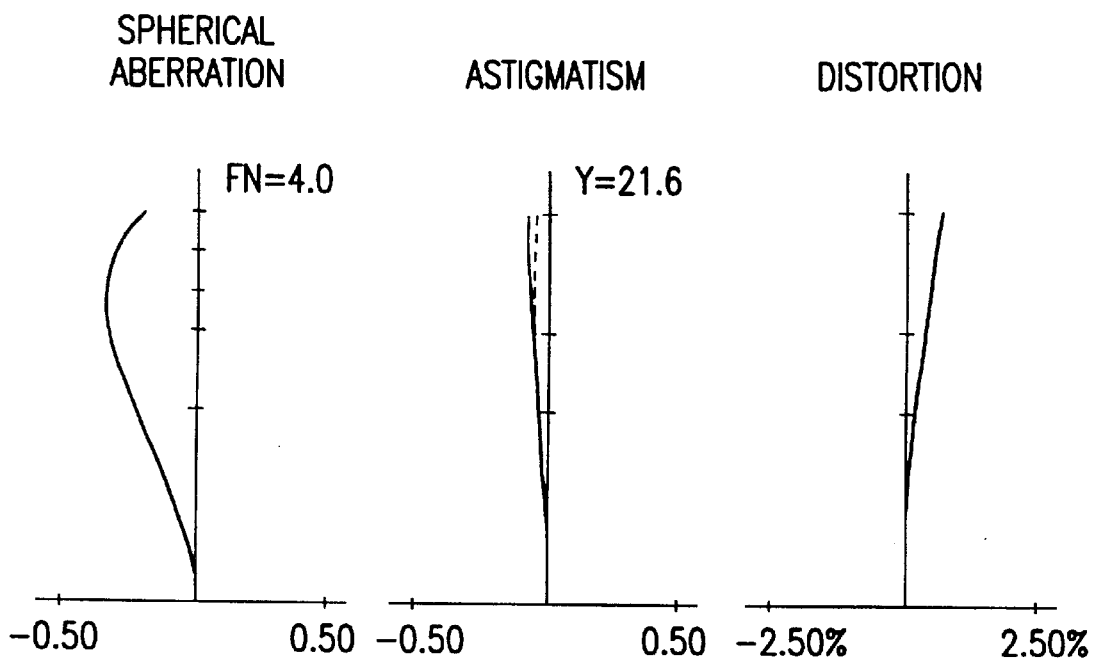
Figure 21C:
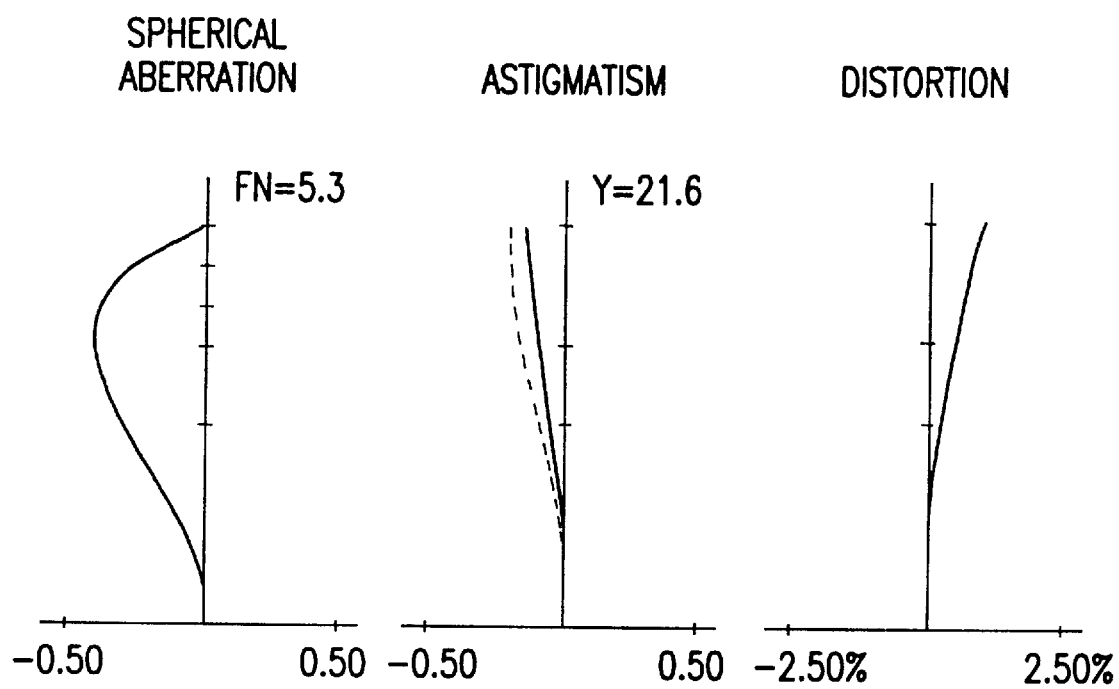
Figure 22A:
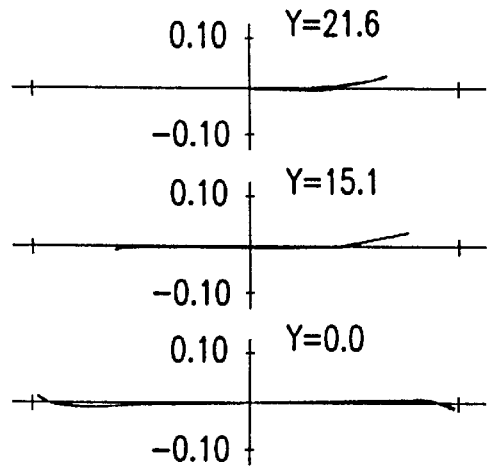
FIGS. 22(A)–(F) show the seventh embodiment corresponding to FIG. 4.
Figure 22B:
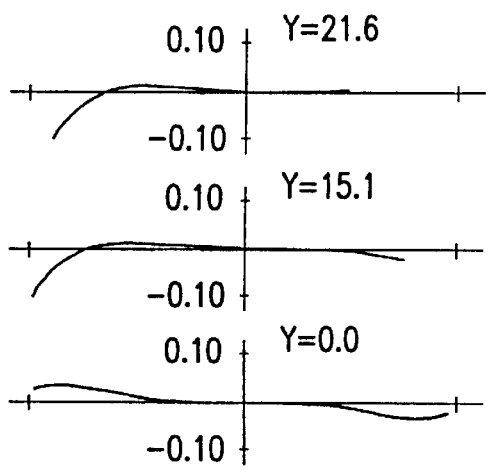
Figure 22C:
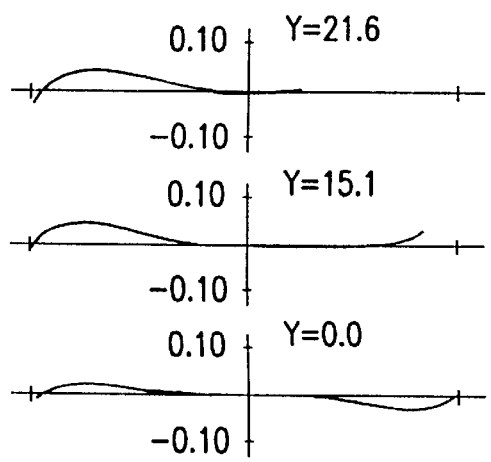
Figure 22D:
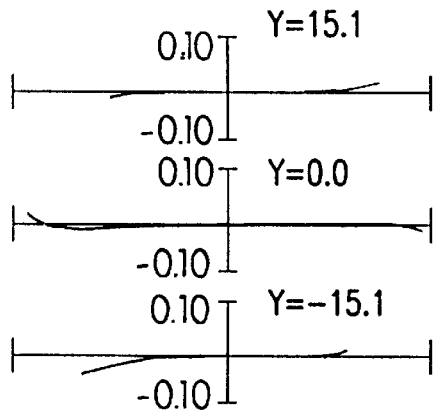
Figure 22E:
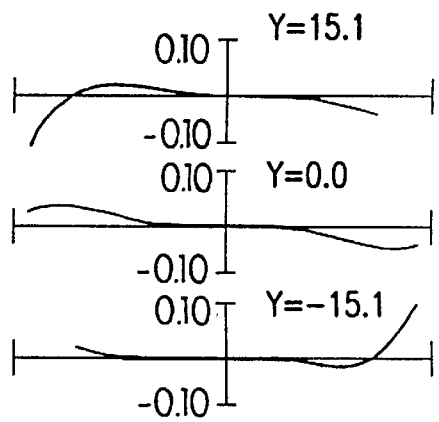
Figure 22F:
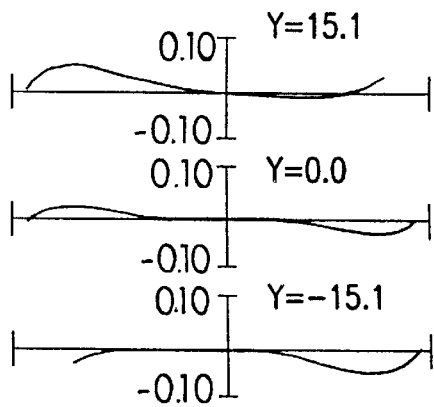
Figure 23A:
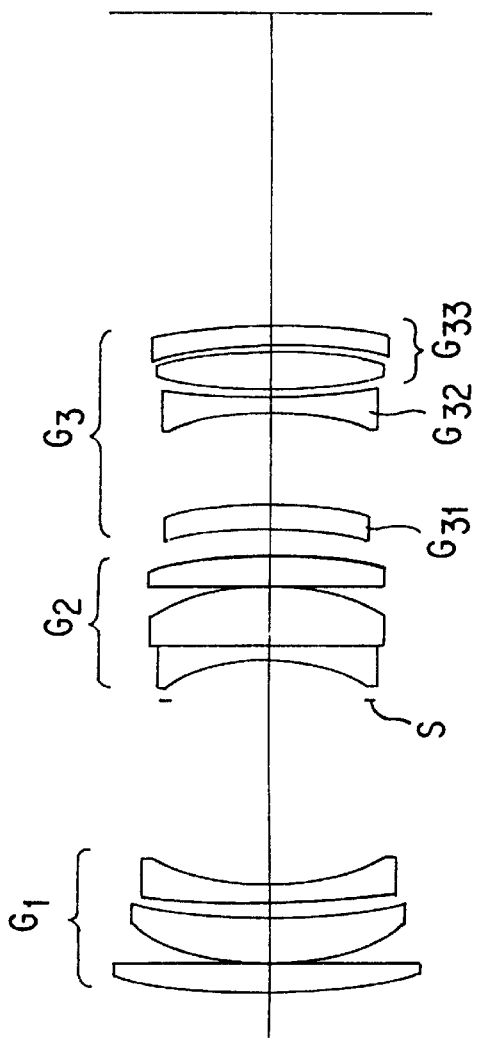
FIGS. 23(A)–(B) show an eighth embodiment corresponding to FIG. 2.
Figure 23B:
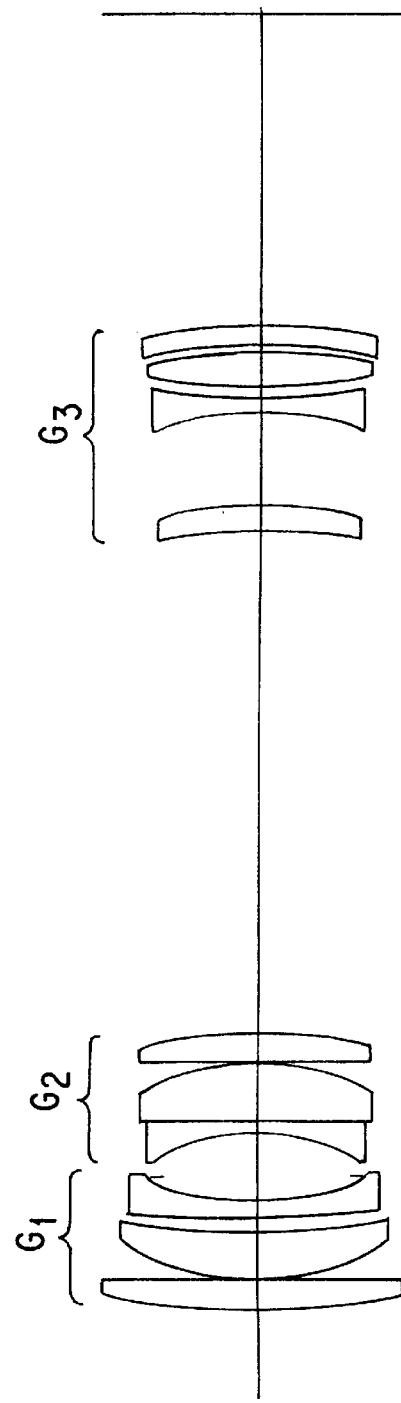
Figure 24A:
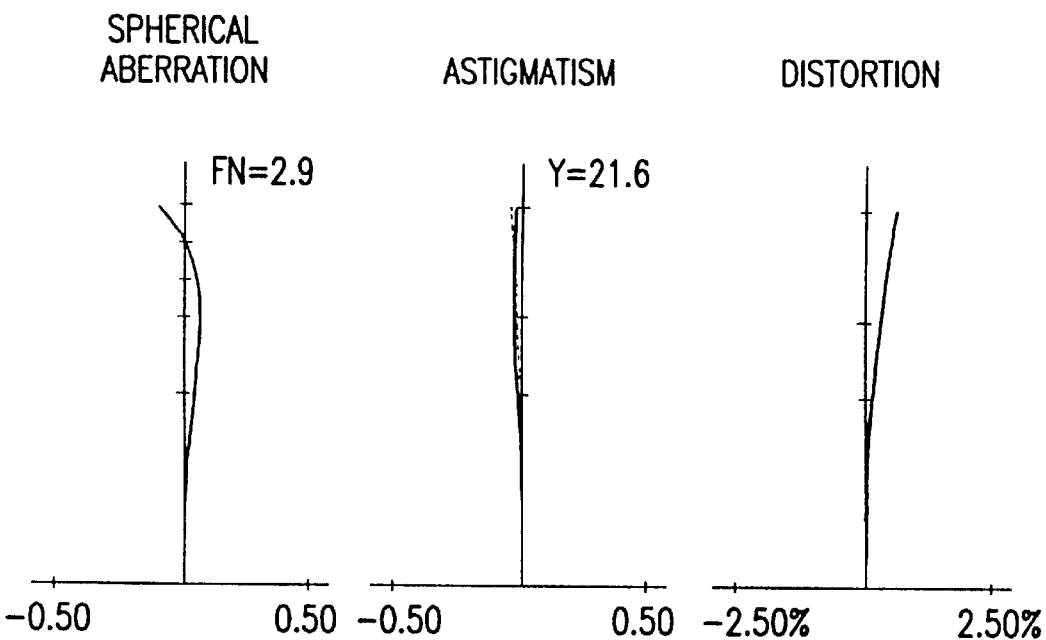
FIGS. 24(A)–(C) show the eighth embodiment corresponding to FIG. 3.
Figure 24B:
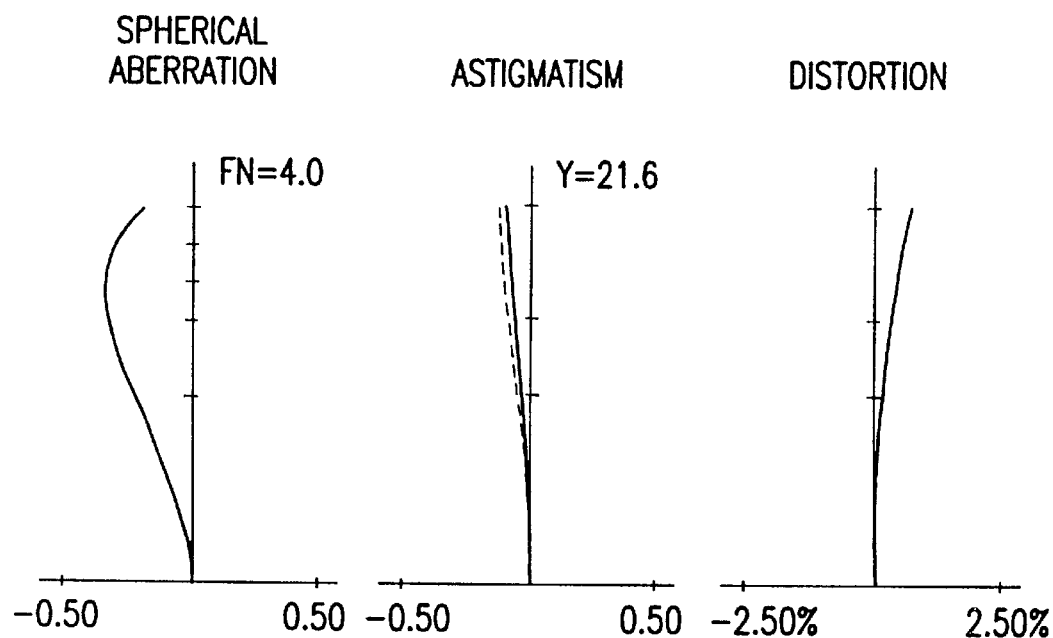
Figure 24C:
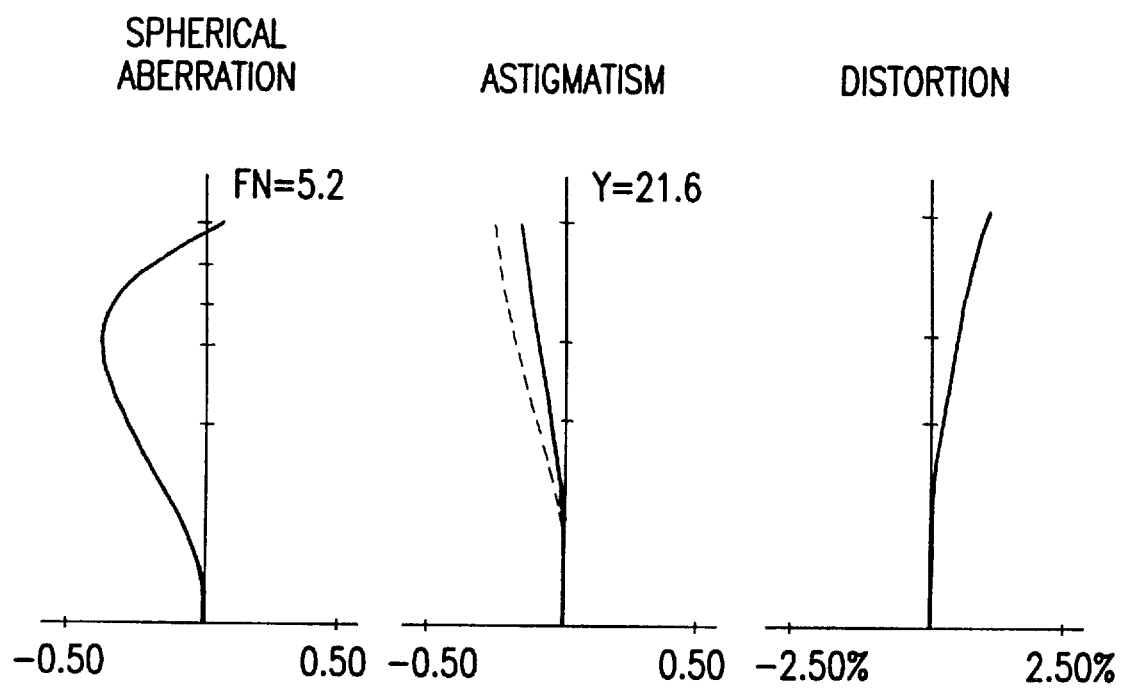
Figure 25A:
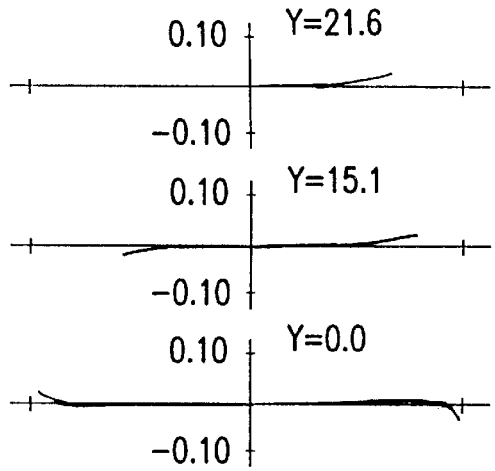
FIGS. 25(A)–(F) show the eighth embodiment corresponding to FIG. 4.
Figure 25B:
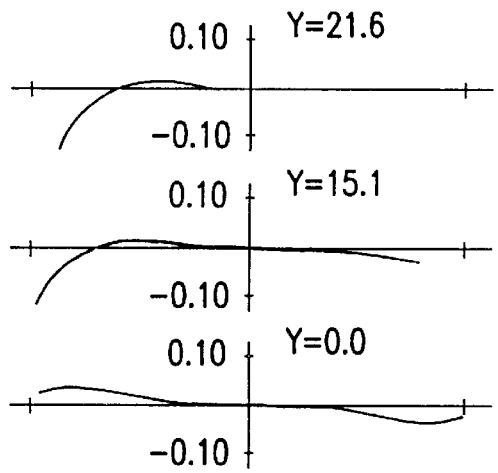
Figure 25C:
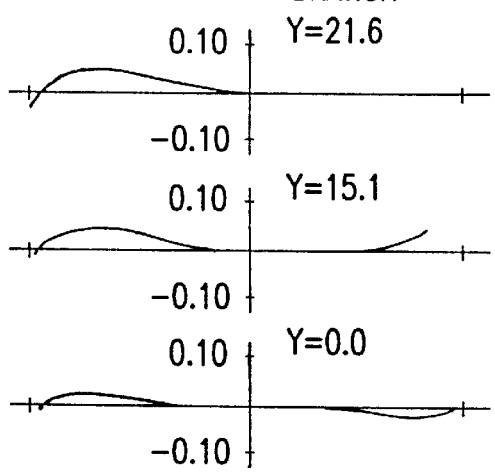
Figure 25D:
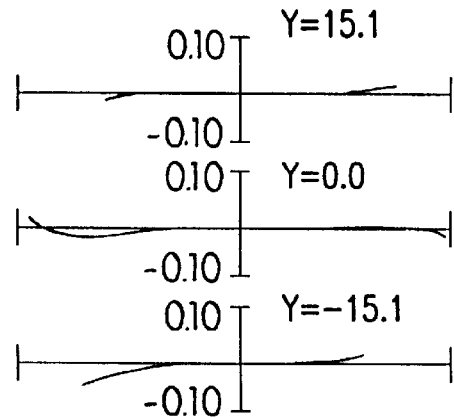
Figure 25E:
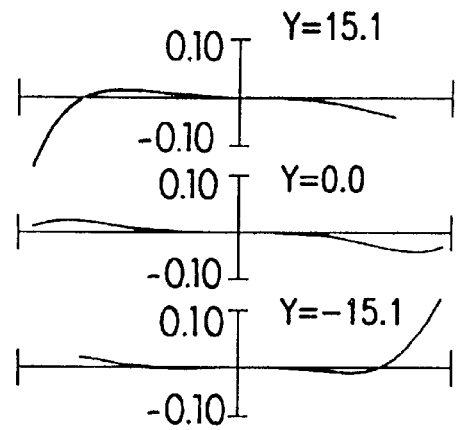
Figure 25F:
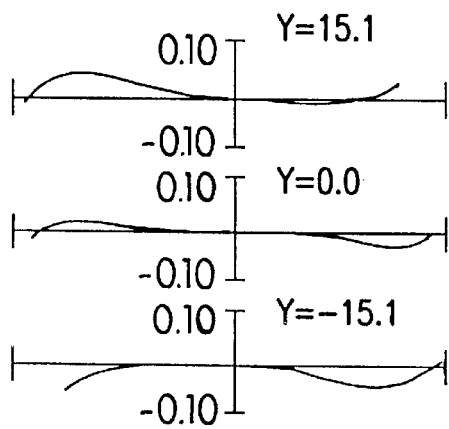

FIGS. 3, 6, 9, 12, 15, 18, 21 and 24 show the spherical aberration, astigmatism, and distortion aberration in the first-eighth embodiments. In each figure, (A), (B) and (C) indicate the aberrations of shooting at infinite object distance, at ½ magnification and at equal magnifications, respectively. Moreover, FIGS. 4, 7, 10, 13, 16, 19, 22 and 25 show the transverse aberration in the first-eighth embodiments. In each figure, (A), (B) and (C) indicate the time of shooting at an infinite object distance, at ½ magnification and at equal magnification, respectively, when there is no vibration. Further, (D), (E) and (F) indicate the transverse aberration at the time of shooting at infinite object distance, at ½ magnification and at equal magnifications, respectively, after the correction of the vibration. Each aberration described above shows an aberration to the d-line and in each figure, FN and Y indicate the F number and the image heights respectively. Moreover, in the figures for the astigmatism, broken lines and solid lines indicate the meridional image plane and sagittal image plane, respectively.

As is clear from each figure, the aberrations are corrected in each embodiment. That is, the present invention uses the composition of the lens system described earlier and realizes a high performance long focal length microlens system that controls the variation of aberrations such that aberrations are well balanced from shooting at infinite object distance to close object distance by executing a focusing method that satisfies the conditional Equations (1), (2) or (3).

In addition, in each of the described embodiments, shifting is used to move the first subgroup G31 and the second subgroup G32 in parallel in the direction that perpendicularly intersects the optical axis. However, by tilting to incline the first subgroup G31 and the second subgroup G32 to the optical axis, degradation of the image forming performance caused by vibrations of hands can be decreased.

Moreover, because the amount of change of small movements and small inclinations are not absolute, which is determined from the absolute value of the aberration of the lens system, the condition of balance of the aberration, the purpose of photography, structurally allowed spaces and the like, and setting up any condition to the amount of the change is meaningless. The amount of movement by the image when moving a part of the lens group of the third lens group by 0.3 mm in the direction that perpendicularly intersects the optical axis is indicated in each Table as Vibration Isolation Data and the transverse aberrations at that time are indicated in each aberration figures.

Accordingly, a high performance long focal length microlens system can be obtained in which the variation of aberration from shooting at the infinite object distance to equal magnification is small and the aberration in the entire body is well balanced. The present invention also achieves a high performance long focal length microlens system that can decreases degradation of image performance caused by vibration.

While the invention has been described in relation to preferred embodiments, many modifications and variations are apparent from the description of the invention. All such modifications and variations are intended to be within the scope of the present invention as defined in the appended claims.

What is claimed is:

1. A long focal length microlens system extending along an optical axis from an object side to an image side, the system comprising:
   a first lens group of positive refractive power;
   a second lens group of positive refractive power on the image side of the first lens group; and
   a third lens group of negative refractive power on the image side of the second lens group, wherein a gap D1 of lens apexes between the first group and the second group is reduced and a gap D2 of lens apexes between said second group and said third group is increased when focusing from an infinite object distance to a close object distance to satisfy $0.16<|\Delta D1|/\Delta D2<0.5$ where $\Delta D1$ is (D1 at any object distance)−(D1 at any shooting distance), and $\Delta D2$ is (D2 at any shooting distance)−(D2 in the infinite object distance).

2. The long focal length microlens system of claim 1, wherein a value of $|\Delta D1|/\Delta D2$ is smaller at the close object distance than at the infinite distance.

3. The long focal length microlens system of claim 1, wherein the third lens group comprises:
   a first lens subgroup of positive refractive power;
   a second lens subgroup of negative refractive power on the image side of the first lens subgroup; and
   a third lens subgroup of positive refractive power on the image side of the second lens subgroup.

4. The long focal length microlens system of claim 3, wherein the first lens subgroup includes a positive meniscus lens and the second lens subgroup includes a bi-concave lens.

5. The long focal length microlens system of claim 3, wherein the third lens subgroup includes a bi-convex lens.

6. The long focal length microlens system of claim 5, wherein the third lens subgroup further includes a negative meniscus lens.

7. The long focal length microlens system of claim 3, further comprising a moving device that moves the first lens subgroup and the second lens subgroup in a substantially perpendicular direction to the optical axis.

8. The long focal length microlens system of claim 3, wherein a focal length f3 of the third group and a focal length f31 of the third lens subgroup satisfy $0.8<f31/|f3|<0.91$.

9. The long focal length microlens system of claim 1, wherein f12 is a focal length of the first lens group and the second lens group, and M is (f12 at an equal magnification state)/(F12 at the infinite shooting state), the first lens group and second lens group satisfy $0.74<M<0.84$.

10. The long focal length microlens system of claim 1, wherein N is (D1 at an equal magnification state)/(D1 at an infinite shooting state), the first lens group and the second lens group satisfy $0.30<N<0.60$.

11. A long focal length microlens system extending along an optical axis from an object side to an image side, the system comprising:
    a first lens group of positive refractive power;
    a second lens group of positive refractive power on the image side of the first lens group; and
    a third lens group of negative refractive power on the image side of the second lens group, wherein a gap D1 of lens apexes between the first group and the second group is reduced and a gap D2 of lens apexes between said second group and said third group is increased when focusing from an infinite object distance to a close object distance to satisfy $0.74<M<0.84$ where f12 is a focal length of said first lens group and the second lens group, and M is (f12 at an equal magnification state)/(f12 at an infinite shooting state).

12. The long focal length microlens system of claim 11, where $\Delta D1$ is (D1 at any object distance)–(D1 at any shooting distance), and $\Delta D2$ is (D2 at any shooting distance)–(D2 in the infinite object distance), and the microlens system satisfies $$0.16<|\Delta D1|/\Delta D2<0.5.$$

13. The long focal length microlens system of claim 11, wherein the third lens group comprises:
   a first lens subgroup of positive refractive power;
   a second lens subgroup of negative refractive power on the image side of the first lens subgroup; and
   a third lens subgroup of positive refractive power on the image side of the second lens subgroup.

14. The long focal length microlens system of claim 13, wherein the first lens subgroup includes a positive meniscus lens and the second lens subgroup includes a bi-concave lens.

15. The long focal length microlens system of claim 13, further comprising a moving device that moves the first lens subgroup and the second lens subgroup in a direction substantially perpendicular to the optical axis.

16. The long focal length microlens system of claim 11, wherein N is (D1 at an equal magnification state)/(D1 at an infinite shooting state), the first lens group and the second lens group satisfy $$0.30<N<0.60.$$

17. A long focal length microlens system extending along an optical axis from an object side to an image side, the system comprising:
   a first lens group of positive refractive power;
   a second lens group of positive refractive power on the image side of the first lens group; and
   a third lens group of negative refractive power on the image side of the second lens group, wherein a gap D1 of lens apexes between the first group and the second group is reduced and a gap D2 of lens apexes between said second group and said third group is increased when focusing from an infinite object distance to a close object distance to satisfy $$0.30<N<0.60$$

where N is (D1 at an equal magnification state)/(D1 at at infinite shooting state).

18. The long focal length microlens system of claim 17, wherein F12 is a focal length of said first lens group and the second lens group, and M is (F12 at an equal magnification state)/(F12 at an infinite shooting state), the first lens group and the second lens group satisfy $$0.74<M<0.84.$$

19. The long focal length microlens system of claim 17, wherein $\Delta D1$ is (D1 at any object distance)–(D2 at any shooting distance), and $\Delta D2$ is (D2 at any shooting distance)–(D2 in an infinite object distance), and the microlens system satisfies $$0.16<|\Delta D1|/\Delta D2<0.5.$$

20. The long focal length microlens system of claim 17, wherein the third lens group comprises:
   a first lens subgroup of positive refractive power;
   a second lens subgroup of negative refractive power on the image side of the first lens subgroup; and
   a third lens subgroup of positive refractive power on the image side of the second lens subgroup.

* * * * *